US011237010B2

(12) United States Patent
Zhang et al.

(10) Patent No.: US 11,237,010 B2
(45) Date of Patent: Feb. 1, 2022

(54) SYSTEMS AND METHODS FOR ON-DEMAND SERVICE

(71) Applicant: BEIJING DIDI INFINITY TECHNOLOGY AND DEVELOPMENT CO., LTD., Beijing (CN)

(72) Inventors: Tihui Zhang, Beijing (CN); Meiling Huang, Beijing (CN); Xiaoke Chen, Beijing (CN); Ning Ma, Beijing (CN)

(73) Assignee: BEIJING DIDI INFINITY TECHNOLOGY AND DEVELOPMENT CO., LTD., Beijing (CN)

( * ) Notice: Subject to any disclaimer, the term of this patent is extended or adjusted under 35 U.S.C. 154(b) by 243 days.

(21) Appl. No.: 16/541,197

(22) Filed: Aug. 15, 2019

(65) Prior Publication Data

US 2019/0368887 A1 Dec. 5, 2019

Related U.S. Application Data

(63) Continuation of application No. PCT/CN2017/104061, filed on Sep. 28, 2017.

(30) Foreign Application Priority Data

Feb. 15, 2017 (CN) .......................... 201710082274.3
Feb. 24, 2017 (CN) .......................... 201710104502.2
Mar. 16, 2017 (CN) .......................... 201710157234.0

(51) Int. Cl.
*G06Q 50/30* (2012.01)
*G01C 21/34* (2006.01)
(Continued)

(52) U.S. Cl.
CPC ..... *G01C 21/3484* (2013.01); *G01C 21/3415* (2013.01); *G01C 21/362* (2013.01);
(Continued)

(58) Field of Classification Search
CPC ... G06F 3/147; G01C 21/3461; B60N 2/0244; H04N 5/23218; G06Q 20/405;
(Continued)

(56) References Cited

U.S. PATENT DOCUMENTS 8,352,175 B2 * 1/2013 Bauchot ................ G01C 21/00
701/408
10,453,011 B1 * 10/2019 Briggs ............... G01C 21/3697
(Continued)

FOREIGN PATENT DOCUMENTS

CN     101291217 A    10/2008
CN     102543084 A     7/2012
(Continued)

OTHER PUBLICATIONS

The second Office Action in Chinese Application No. 201710082274.3 dated Apr. 29, 2020, 28 pages.
(Continued)

*Primary Examiner* — Yuri Kan
(74) *Attorney, Agent, or Firm* — Metis IP LLC

(57) ABSTRACT

The present disclosure relates to systems and methods for operating an online on-demand service platform. The systems may perform the methods to: receive confirmation that a service provider has accepted a service request from a service requester; acquire feature information associated with the service provider; acquire surrounding information associated with the service provider; generate identification information of the service provider based on the feature information or the surrounding information for the service requester to identify the service provider; and transmit the (Continued)

identification information of the service provider to a requester terminal associated with the service requester.

18 Claims, 8 Drawing Sheets

(51) Int. Cl.
  *H04W 4/44* (2018.01)
  *H04W 4/50* (2018.01)
  *G01C 21/36* (2006.01)
  *H04L 29/08* (2006.01)
  *H04W 4/02* (2018.01)
(52) U.S. Cl.
  CPC .......... *G01C 21/3661* (2013.01); *H04L 67/16* (2013.01); *H04W 4/025* (2013.01); *H04W 4/44* (2018.02); *H04W 4/50* (2018.02)
(58) Field of Classification Search
  CPC ... G06Q 10/0834; G06Q 50/01; H04W 4/025; G01S 19/254
  See application file for complete search history.

(56) References Cited

U.S. PATENT DOCUMENTS

| | | | |
|---|---|---|---|
| 2011/0053552 | A1 | 3/2011 | Kim et al. |
| 2011/0099040 | A1 | 4/2011 | Felt et al. |
| 2013/0225118 | A1 | 8/2013 | Jang et al. |
| 2013/0246301 | A1 | 9/2013 | Radhakrishnan et al. |
| 2013/0345980 | A1 | 12/2013 | Van Os et al. |
| 2014/0337949 | A1 | 11/2014 | Hoyos |
| 2014/0358409 | A1 | 12/2014 | Khoe et al. |
| 2015/0011185 | A1 | 1/2015 | Foy et al. |
| 2015/0149288 | A1 | 5/2015 | Saretto et al. |
| 2016/0227107 | A1* | 8/2016 | Beaumont ............. G06F 3/0304 |
| 2016/0275638 | A1* | 9/2016 | Korpi .................... G06Q 50/30 |
| 2016/0328471 | A1 | 11/2016 | Goldin et al. |
| 2017/0052034 | A1 | 2/2017 | Magazinik et al. |
| 2017/0249847 | A1 | 8/2017 | Marueli |
| 2017/0285642 | A1* | 10/2017 | Rander ............. G05D 23/1905 |
| 2018/0156923 | A1* | 6/2018 | Berclaz ................ G01S 19/254 |
| 2018/0340466 | A1 | 11/2018 | Li et al. |
| 2019/0095849 | A1* | 3/2019 | Sweeney .......... G06Q 10/08355 |

FOREIGN PATENT DOCUMENTS

| | | |
|---|---|---|
| CN | 102622877 A | 8/2012 |
| CN | 103164954 A | 6/2013 |
| CN | 103428698 A | 12/2013 |
| CN | 103489306 A | 1/2014 |
| CN | 103632534 A | 3/2014 |
| CN | 103944689 A | 7/2014 |
| CN | 104374399 A | 2/2015 |
| CN | 104615350 A | 5/2015 |
| CN | 105333880 A | 2/2016 |
| CN | 105893450 A | 8/2016 |
| CN | 303774612 S | 8/2016 |
| CN | 105975224 A | 9/2016 |
| CN | 106250827 A | 12/2016 |
| CN | 106355921 A | 1/2017 |
| CN | 106373076 A | 2/2017 |
| CN | 106469514 A | 3/2017 |
| CN | 106530792 A | 3/2017 |

OTHER PUBLICATIONS

First Office Action in Chinese Application No. 201710104502.2 dated Apr. 10, 2020, 14 pages.
Zhu Guowei, Didi Taxi: Is There Really Such A God?, Marketing Cases, 2014, 25 pages.
First Office Action in Chinese Application No. 201780086614.8 dated Jun. 16, 2020, 23 pages.
International Search Report in PCT/CN2017/111699 dated Feb. 22, 2018, 5 pages.
Written Opinion in PCT/CN2017/111699 dated Feb. 22, 2018, 4 pages.
The Extended European Search Report in European Application No. 17896916.8 dated Dec. 18, 2019, 8 pages.
Extended European Search Report in European Application No. 17897010.9 dated Jan. 16, 2020, 8 pages.
International Search Report in PCT/CN2017/104061 dated Jan. 4, 2018, 4 pages.
Written Opinion in PCT/CN2017/104061 dated Jan. 4, 2018, 4 pages.
The Third Office Action in Chinese Application No. 201710157234.0 dated Sep. 10, 2020, 18 pages.
Notice of Reasons for Rejection in Japanese Application No. 2019-564573 dated Dec. 1, 2020, 7 pages.

* cited by examiner

SYSTEMS AND METHODS FOR ON-DEMAND SERVICE

CROSS-REFERENCE TO RELATED APPLICATIONS

This application is a continuation of International Application No. PCT/CN2017/104061, filed on Sep. 28, 2017, which claims priority to Chinese Application No. 201710082274.3 filed on Feb. 15, 2017, Chinese Application No. 201710104502.2 filed on Feb. 24, 2017, and Chinese Application No. 201710157234.0 filed on Mar. 16, 2017, the contents of which are incorporated herein by reference in its entirety.

TECHNICAL FIELD

The present disclosure generally relates to systems and methods for on-demand service, and in particular, to systems and methods for displaying information on a requester terminal.

BACKGROUND

On-demand services utilizing Internet technology, such as online taxi services, have become increasingly popular because of their convenience. A service requester may request an on-demand service and receive information about the on-demand service by a requester terminal. However, in some situations, it is difficult for the service requester to monitor the progression of the on-demand service and/or identify the service provider. Therefore, it is desirable to provide systems and methods for an on-demand service to provide information in a manner that makes it easier and more convenient for the service requester to monitor the progression of the on-demand service and/or identify the service provider.

SUMMARY

According to a first aspect of the present disclosure, a system is provided. The system may include one or more storage media and one or more processors configured to communicate with the one or more storage media. The one or more storage media may store a set of instructions for operating an online on-demand service platform. When executing the set of instructions, the one or more processors may be configured to cause the system to perform one or more of the following operations. The one or more processors may receive confirmation that a service provider has accepted a service request from a service requester. The one or more processors may acquire feature information associated with the service provider. The one or more processors may acquire surrounding information associated with the service provider. The one or more processors may generate identification information of the service provider based on the feature information or the surrounding information for the service requester to identify the service provider. The one or more processors may transmit the identification information of the service provider to a requester terminal associated with the service requester.

In some embodiments, the feature information associated with the service provider may include at least one of: a type of a first vehicle associated with the service provider, a color of the first vehicle, a plate number of the first vehicle, a mark on a surface of the first vehicle, a position of the first vehicle, and a direction that the vehicle faces. The surrounding information associated with the service provider may include at least one of: one or more positions of one or more second vehicles that are within a predetermined area including the first vehicle and the service requester, the predetermined area being a circle area with a diameter of a straight-line distance between the first vehicle and the service requester, a type of at least one of the one or more second vehicles, a color of the at least one of the one or more second vehicles, and a plate number of the at least one of the one or more second vehicles.

In some embodiments, the identification information of the service provider may include an image of the first vehicle showing at least one of: the type of the first vehicle, the color of the first vehicle, the plate number of the first vehicle, and the mark on the surface of the first vehicle.

In some embodiments, the one or more processors may acquire a position of the service requester and a direction that the service requester faces. The direction may be acquired by monitoring the service requester's physical features, predicting the service requester's behavior, or instructing the service requester to face the direction. The one or more processors may generate the image of the first vehicle showing the first vehicle from a perspective of the service requester based on the position of the service requester, the direction that the service requester faces, the position of the first vehicle, and the direction that the first vehicle faces.

In some embodiments, the identification information of the service provider may include a map showing the position of the first vehicle and the one or more positions of the one or more second vehicles that are within the predetermined area, wherein the first vehicle is highlighted on the map.

In some embodiments, the map may show a route from a position of the service requester to the position of the first vehicle, and at least one of: the type of the first vehicle, the color of the first vehicle, the plate number of the first vehicle, and the mark on the surface of the first vehicle.

In some embodiments, the map may show at least one of: the type of the at least one of the one or more second vehicles, the color of the at least one of the one or more second vehicles, and the plate number of the at least one of the one or more second vehicles.

In some embodiments, the one or more processors may send a display instruction along with the identification information to the requester terminal. The display instruction may prompt the requester terminal to display the identification information on a screen of the requester terminal when the screen is locked.

According to another aspect of the present disclosure, a system is provided. The system may include one or more storage media and one or more processors configured to communicate with the one or more storage media. The one or more storage media may store a set of instructions for operating an online on-demand service platform. When executing the set of instructions, the one or more processors may be configured to cause the system to perform one or more of the following operations. The one or more processors may acquire a position of a service provider that accepts a service request of an on-demand service. The one or more processors may determine a process stage that the on-demand service is in based on the position of the service provider. The one or more processors may determine status information of the service provider. The status information may correspond to the process stage that the on-demand service is in. The one or more processors may transmit the status information along with a display instruction to a requester terminal associated with a service requester that initiates the service request. The display instruction may prompt the requester terminal to display the status information on a screen of the requester terminal when the screen is locked.

In some embodiments, the process stage may include a first stage, a second stage, a third stage and a fourth stage. In the first stage, the service provider may have not arrived at a pickup location to pick up the service requester, and a route distance between the position of the service provider and the pickup location may be longer than a first threshold. In the second stage, the service provider may have not arrived at the pickup location, and the route distance between the position of the service provider and the pickup location may be shorter than the first threshold. In the third stage, the service provider may be traveling to a destination of the service requester, and a route distance between the position of the service provider and the destination may be longer than a second threshold. In the fourth stage, the service provider may be traveling to the destination of the service requester, and the route distance between the position of the service provider and the destination may be shorter than the second threshold.

In some embodiments, the status information corresponding to the first stage may include at least one of: the position of the service provider, the pickup location, a position of the service requester, the route distance between the position of the service provider and the pickup location, a travel time from the position of the service provider to the pickup location, a type of a vehicle associated with the service provider, a color of the vehicle, a plate number of the vehicle, an estimated time of arrival to the pickup location, and a route from the position of the service provider to the pickup location. The status information corresponding to the second stage may include at least one of: the type of the vehicle, the color of the vehicle, the plate number of the vehicle, the position of the service requester, the position of the service provider, and the pickup location. The status information of the service provider corresponding to the third stage may include at least one of: the route distance between the position of the service provider and the destination, a travel time from the position of the service provider to the destination, an estimated time of arrival to the destination, the position of the service provider, the destination, an estimated price of the service request, a route from the pickup location to the destination, and a road condition from the pickup location to the destination. The status information of the service provider corresponding to the fourth stage may include at least one of: the position of the service provider, the destination, and the estimated price of the service request.

According to yet another aspect of the present disclosure, a method is provided. The method may be implemented on a computing device having one or more processors and one or more storage media. The method may include one or more of the following operations. The one or more processors may receive confirmation that a service provider has accepted a service request from a service requester. The one or more processors may acquire feature information associated with the service provider. The one or more processors may acquire surrounding information associated with the service provider. The one or more processors may generate identification information of the service provider based on the feature information or the surrounding information for the service requester to identify the service provider. The one or more processors may transmit the identification information of the service provider to a requester terminal associated with the service requester.

According to yet another aspect of the present disclosure, a method is provided. The method may be implemented on a computing device having one or more processors and one or more storage media. The method may include one or more of the following operations. The one or more processors may acquire a position of a service provider that accepts a service request of an on-demand service. The one or more processors may determine a process stage that the on-demand service is in based on the position of the service provider. The one or more processors may determine status information of the service provider. The status information may correspond to the process stage that the on-demand service is in. The one or more processors may transmit the status information along with a display instruction to a requester terminal associated with a service requester that initiates the service request. The display instruction may prompt the requester terminal to display the status information on a screen of the requester terminal when the screen is locked.

According to yet another aspect of the present disclosure, a system is provided. The system may comprise: an acquisition module configured to receive confirmation that a service provider has accepted a service request from a service requester; acquire feature information associated with the service provider; and acquire surrounding information associated with the service provider; an identification information generation module configured to generate identification information of the service provider based on the feature information or the surrounding information for the service requester to identify the service provider; and a transmission module configured to transmit the identification information of the service provider to a requester terminal associated with the service requester.

According to yet another aspect of the present disclosure, a system is provided. The system may comprise: an acquisition module configured to acquire a position of a service provider that accepts a service request of an on-demand service; a status information generation module configured to determine a process stage that the on-demand service is in based on the position of the service provider; and determine status information of the service provider, wherein the status information corresponds to the process stage that the on-demand service is in; and a transmission module configured to transmit the status information along with a display instruction to a requester terminal associated with a service requester that initiates the service request, wherein the display instruction prompts the requester terminal to display the status information on a screen of the requester terminal when the screen is locked.

According to yet another aspect of the present disclosure, a non-transitory computer readable medium may comprise at least one set of instructions. The at least one set of instructions may be executed by one or more processors of a computing device. The one or more processors may receive confirmation that a service provider has accepted a service request from a service requester. The one or more processors may acquire feature information associated with the service provider. The one or more processors may acquire surrounding information associated with the service provider. The one or more processors may generate identification information of the service provider based on the feature information or the surrounding information for the service requester to identify the service provider. The one or more processors may transmit the identification information of the service provider to a requester terminal associated with the service requester.

According to yet another aspect of the present disclosure, a non-transitory computer readable medium may comprise at least one set of instructions. The at least one set of instructions may be executed by one or more processors of a computing device. The one or more processors may acquire a position of a service provider that accepts a service request of an on-demand service. The one or more processors may determine a process stage that the on-demand service is in based on the position of the service provider. The one or more processors may determine status information of the service provider. The status information may correspond to the process stage that the on-demand service is in. The one or more processors may transmit the status information along with a display instruction to a requester terminal associated with a service requester that initiates the service request. The display instruction may prompt the requester terminal to display the status information on a screen of the requester terminal when the screen is locked.

Additional features will be set forth in part in the description which follows, and in part will become apparent to those skilled in the art upon examination of the following and the accompanying drawings or may be learned by production or operation of the examples. The features of the present disclosure may be realized and attained by practice or use of various aspects of the methodologies, instrumentalities and combinations set forth in the detailed examples discussed below.

BRIEF DESCRIPTION OF THE DRAWINGS

The present disclosure is further described in terms of exemplary embodiments. These exemplary embodiments are described in detail with reference to the drawings. These embodiments are non-limiting exemplary embodiments, in which like reference numerals represent similar structures throughout the several views of the drawings, and wherein.

DETAILED DESCRIPTION

Figure 1:
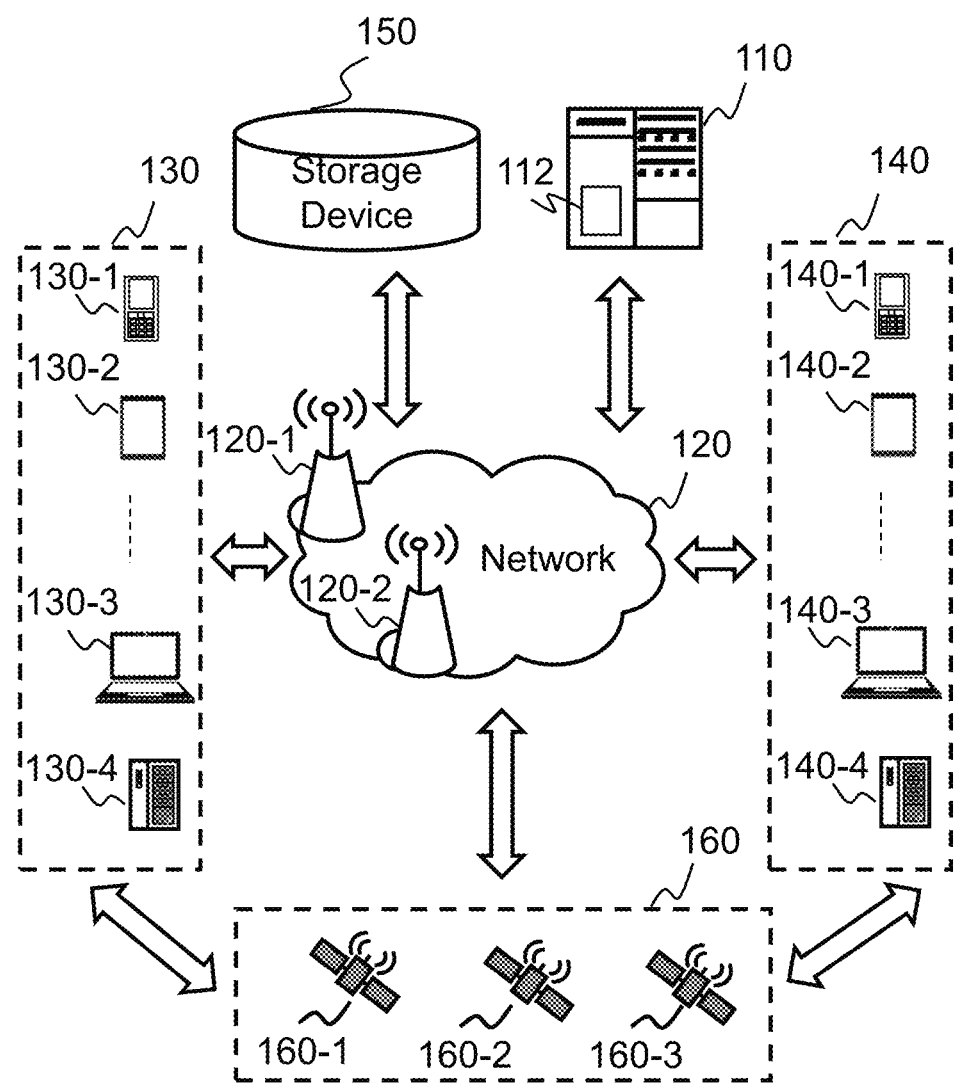
FIG. 1 is a schematic diagram illustrating an exemplary on-demand service system according to some embodiments of the present disclosure.

The following description is presented to enable any person skilled in the art to make and use the present disclosure, and is provided in the context of a particular application and its requirements. Various modifications to the disclosed embodiments will be readily apparent to those skilled in the art, and the general principles defined herein may be applied to other embodiments and applications without departing from the spirit and scope of the present disclosure. Thus, the present disclosure is not limited to the embodiments shown, but is to be accorded the widest scope consistent with the claims.

The terminology used herein is for the purpose of describing particular example embodiments only and is not intended to be limiting. As used herein, the singular forms "a," "an," and "the" may be intended to include the plural forms as well, unless the context clearly indicates otherwise. It will be further understood that the terms "comprises," "comprising," "includes," and/or "including" when used in this disclosure, specify the presence of stated features, integers, steps, operations, elements, and/or components, but do not preclude the presence or addition of one or more other features, integers, steps, operations, elements, components, and/or groups thereof.

These and other features, and characteristics of the present disclosure, as well as the methods of operations and functions of the related elements of structure and the combination of parts and economies of manufacture, may become more apparent upon consideration of the following description with reference to the accompanying drawing(s), all of which form part of this specification. It is to be expressly understood, however, that the drawing(s) are for the purpose of illustration and description only and are not intended to limit the scope of the present disclosure. It is understood that the drawings are not to scale.

The flowcharts used in the present disclosure illustrate operations that systems implement according to some embodiments of the present disclosure. It is to be expressly understood, the operations of the flowcharts may be implemented not in order. Conversely, the operations may be implemented in inverted order, or simultaneously. Moreover, one or more other operations may be added to the flowcharts. One or more operations may be removed from the flowcharts.

Moreover, while the systems and methods disclosed in the present disclosure are described primarily regarding on-demand transportation service, it should also be understood that this is only one exemplary embodiment. The system or method of the present disclosure may be applied to any other kind of on-demand service. For example, the system or method of the present disclosure may be applied to different transportation systems including land, ocean, aerospace, or the like, or any combination thereof. The vehicle of the transportation systems may include a taxi, a private car, a hitch, a bus, a train, a bullet train, a high speed rail, a subway, a vessel, an aircraft, a spaceship, a hot-air balloon, a driverless vehicle, a bicycle, a tricycle, a motorcycle, or the like, or any combination thereof. The transportation system may also include any transportation system that applies management and/or distribution, for example, a system for transmitting and/or receiving an express, or a system for a take-out service. The application scenarios of the system or method of the present disclosure may include a web page, a plug-in of a browser, a client terminal, a custom system, an internal analysis system, an artificial intelligence robot, or the like, or any combination thereof.

The terms "passenger," "requester," "service requester," and "customer" in the present disclosure are used interchangeably to refer to an individual, an entity or a tool that may request or order a service. Also, the terms "driver," "provider," "service provider," and "supplier" in the present disclosure are used interchangeably to refer to an individual, an entity, or a tool that may provide a service or facilitate the providing of the service. The term "user" in the present disclosure may refer to an individual, an entity, or a tool that may request a service, order a service, provide a service, or facilitate the providing of the service. For example, the user may be a passenger, a driver, an operator, or the like, or any combination thereof. In the present disclosure, terms "passenger" and "passenger terminal" may be used interchangeably, and terms "driver" and "driver terminal" may be used interchangeably.

The term "service request" in the present disclosure refers to a request that initiated by a passenger, a requester, a service requester, a customer, a driver, a provider, a service provider, a supplier, or the like, or any combination thereof. The service request may be accepted by any one of a passenger, a requester, a service requester, a customer, a driver, a provider, a service provider, or a supplier. The service request may be chargeable, or free.

The positioning technology used in the present disclosure may include a global positioning system (GPS), a global navigation satellite system (GLONASS), a compass navigation system (COMPASS), a Galileo positioning system, a quasi-zenith satellite system (QZSS), a wireless fidelity (WiFi) positioning technology, or the like, or any combination thereof. One or more of the above positioning technologies may be used interchangeably in the present disclosure.

An aspect of the present disclosure relates to systems and methods for displaying information relating to an online on-demand service (e.g., a taxi service). In order to help a passenger who initiates a service request of the taxi service to identify a vehicle of a driver who accepts the service request easily and quickly, an online on-demand service platform may generate an image showing a type of the vehicle of the driver, a color of the vehicle of the driver, a plate number of the vehicle of the driver, and/or a mark on a surface of the vehicle of the driver, and showing the vehicle of the driver from a perspective of the passenger. Alternatively or additionally, the online on-demand service platform may generate a map showing a real-time position of the vehicle of the driver and real-time positions of other vehicles surrounding the vehicle of the driver. In order to help the passenger to monitor the process of the on-demand service without unlocking the passenger's smart phone when the passenger's smart phone is locked, the online on-demand service platform may determine information corresponding to the process of the on-demand service, and send the information corresponding to the process of the on-demand service along with a display instruction to the passenger's smart phone. The display instruction may prompt the passenger's smart phone to display the information corresponding to the process of the on-demand service on a lock screen interface of the passenger's smart phone when the passenger's smart phone is locked.

It should be noted that online on-demand transportation service, such as online taxi service, is a new form of service rooted only in post-Internet era. It provides technical solutions to users and service providers that could raise only in post-Internet era. In the pre-Internet era, when a user hails a taxi on the street, the taxi request and acceptance occur only between the passenger and one taxi driver that sees the passenger. If the passenger hails a taxi through a telephone call, the service request and acceptance may occur only between the passenger and one service provider (e.g., one taxi company or agent). Online taxi service, however, obtains transaction requests in real-time and automatically.

The online taxi service also allows a user of the service to real-time and automatic distribute a service request to a vast number of individual service providers (e.g., taxi) distance away from the user and allows a plurality of service providers to respond to the service request simultaneously and in real-time. Therefore, through Internet, the online on-demand transportation systems may provide a much more efficient transaction platform for the users and the service providers that may never met in a traditional pre-Internet transportation service system.

FIG. 1 is a schematic diagram illustrating an exemplary on-demand service system according to some embodiments of the present disclosure. For example, an on-demand service system 100 may be an online on-demand transportation service system for transportation services such as taxi hailing, chauffeur services, delivery service, carpool, bus service, take-out service, driver hiring and shuttle services. For brevity, the methods and/or systems described in the present disclosure may take a taxi service as an example. It should be noted that the taxi service is merely provided for the purposes of illustration, and not intended to limit the scope of the present disclosure. For persons having ordinary skills in the art, the methods and/or systems described in the present disclosure may be applied to other similar situations, such as a take-out service, a delivery service, etc.

The on-demand service system 100 may include a server 110, a network 120, a requester terminal 130, a provider terminal 140, a storage device 150, and a positioning system 160. The server 110 may include a processing engine 112.

In some embodiments, the server 110 may be a single server or a server group. The server group may be centralized, or distributed (e.g., the server 110 may be a distributed system). In some embodiments, the server 110 may be local or remote. For example, the server 110 may access information and/or data stored in the requester terminal 130, the provider terminal 140, and/or the storage device 150 via the network 120. As another example, the server 110 may be directly connected to the requester terminal 130, the provider terminal 140, and/or the storage device 150 to access stored information and/or data. In some embodiments, the server 110 may be implemented on a cloud platform. Merely by way of example, the cloud platform may include a private cloud, a public cloud, a hybrid cloud, a community cloud, a distributed cloud, an inter-cloud, a multi-cloud, or the like, or any combination thereof. In some embodiments, the server 110 may be implemented on a computing device 200 having one or more components illustrated in FIG. 2 in the present disclosure.

In some embodiments, the server 110 may include a processing engine 112. The processing engine 112 may process information and/or data relating to the on-demand service. For example, the processing engine 112 may generate identification information of a service provider. In some embodiments, the processing engine 112 may include one or more processing engines (e.g., single-core processing engine(s) or multi-core processor(s)). Merely by way of example, the processing engine 112 may include one or more hardware processors, such as a central processing unit (CPU), an application-specific integrated circuit (ASIC), an application-specific instruction-set processor (ASIP), a graphics processing unit (GPU), a physics processing unit (PPU), a digital signal processor (DSP), a field-programmable gate array (FPGA), a programmable logic device (PLD), a controller, a microcontroller unit, a reduced instruction-set computer (RISC), a microprocessor, or the like, or any combination thereof.

The network 120 may facilitate the exchange of information and/or data. In some embodiments, one or more components in the on-demand service system 100 (e.g., the server 110, the requester terminal 130, the provider terminal 140, the storage device 150, and the positioning system 160) may send information and/or data to other component(s) in the on-demand service system 100 via the network 120. For example, the server 110 may obtain/acquire a service request from the requester terminal 130 via the network 120. In some embodiments, the network 120 may be any type of wired or wireless network, or a combination thereof. Merely by way of example, the network 130 may include a cable network, a wireline network, an optical fiber network, a telecommunications network, an intranet, the Internet, a local area network (LAN), a wide area network (WAN), a wireless local area network (WLAN), a metropolitan area network (MAN), a wide area network (WAN), a public telephone switched network (PSTN), a Bluetooth™ network, a ZigBee network, a near field communication (NFC) network, or the like, or any combination thereof. In some embodiments, the network 120 may include one or more network access points. For example, the network 120 may include wired or wireless network access points such as base stations and/or internet exchange points 120-1, 120-2, . . . , through which one or more components of the on-demand service system 100 may be connected to the network 120 to exchange data and/or information.

In some embodiments, a requester may be a user of the requester terminal 130. In some embodiments, the user of the requester terminal 130 may be someone other than the requester. For example, a user A of the requester terminal 130 may use the requester terminal 130 to send a service request for a user B, or receive service and/or information or instructions from the server 110. In some embodiments, a provider may be a user of the provider terminal 140. In some embodiments, the user of the provider terminal 140 may be someone other than the provider. For example, a user C of the provider terminal 140 may user the provider terminal 140 to receive a service request for a user D, and/or information or instructions from the server 110. In some embodiments, "requester" and "requester terminal" may be used interchangeably, and "provider" and "provider terminal" may be used interchangeably.

In some embodiments, the requester terminal 130 may include a mobile device 130-1, a tablet computer 130-2, a laptop computer 130-3, a built-in device in a motor vehicle 130-4, or the like, or any combination thereof. In some embodiments, the mobile device 130-1 may include a smart home device, a wearable device, a mobile device, a virtual reality device, an augmented reality device, or the like, or any combination thereof. In some embodiments, the smart home device may include a smart lighting device, a control device of an intelligent electrical apparatus, a smart monitoring device, a smart television, a smart video camera, an interphone, or the like, or any combination thereof. In some embodiments, the wearable device may include a bracelet, footgear, glasses, a helmet, a watch, clothing, a backpack, a smart accessory, or the like, or any combination thereof. In some embodiments, the mobile device may include a mobile phone, a personal digital assistance (PDA), a gaming device, a navigation device, a point of sale (POS) device, a laptop, a desktop, or the like, or any combination thereof. In some embodiments, the virtual reality device and/or the augmented reality device may include a virtual reality helmet, a virtual reality glass, a virtual reality patch, an augmented reality helmet, augmented reality glasses, an augmented reality patch, or the like, or any combination thereof. For example, the virtual reality device and/or the augmented reality device may include a Google Glass™, a RiftCon™, a Fragments™, a Gear VR™, etc. In some embodiments, a built-in device in the motor vehicle 130-4 may include an onboard computer, an onboard television, etc. In some embodiments, the requester terminal 130 may be a device with positioning technology for locating the position of a user of the requester terminal 130 (e.g., a service requester) and/or the requester terminal 130.

In some embodiments, the provider terminal 140 may be a device that is similar to, or the same as the requester terminal 130. In some embodiments, the provider terminal 140 may be a device utilizing positioning technology for locating the position of a user of the provider terminal 140 (e.g., a service provider) and/or the provider terminal 140. In some embodiments, the requester terminal 130 and/or the provider terminal 140 may communicate with one or more other positioning devices to determine the position of the requester, the requester terminal 130, the provider, and/or the provider terminal 140. In some embodiments, the requester terminal 130 and/or the provider terminal 140 may send positioning information to the server 110.

The storage device 150 may store data and/or instructions. In some embodiments, the storage device 150 may store data obtained from the requester terminal 130 and/or the provider terminal 140. In some embodiments, the storage device 150 may store data and/or instructions that the server 110 may execute or use to perform exemplary methods described in the present disclosure. In some embodiments, the storage device 150 may include a mass storage, a removable storage, a volatile read-and-write memory, a read-only memory (ROM), or the like, or any combination thereof. Exemplary mass storage may include a magnetic disk, an optical disk, a solid-state drive, etc. Exemplary removable storage may include a flash drive, a floppy disk, an optical disk, a memory card, a zip disk, a magnetic tape, etc. Exemplary volatile read-and-write memory may include a random access memory (RAM). Exemplary RAM may include a dynamic RAM (DRAM), a double date rate synchronous dynamic RAM (DDR SDRAM), a static RAM (SRAM), a thyrisor RAM (T-RAM), and a zero-capacitor RAM (Z-RAM), etc. Exemplary ROM may include a mask ROM (MROM), a programmable ROM (PROM), an erasable programmable ROM (EPROM), an electrically-erasable programmable ROM (EEPROM), a compact disk ROM (CD-ROM), and a digital versatile disk ROM, etc. In some embodiments, the storage device 150 may be implemented on a cloud platform. Merely by way of example, the cloud platform may include a private cloud, a public cloud, a hybrid cloud, a community cloud, a distributed cloud, an inter-cloud, a multi-cloud, or the like, or any combination thereof.

In some embodiments, the storage device 150 may be connected to the network 120 to communicate with one or more components in the on-demand service system 100 (e.g., the server 110, the requester terminal 130, the provider terminal 140, etc.). One or more components in the on-demand service system 100 may access the data or instructions stored in the storage device 150 via the network 120. In some embodiments, the storage device 150 may be directly connected to or communicate with one or more components in the on-demand service system 100 (e.g., the server 110, the requester terminal 130, the provider terminal 140, etc.). In some embodiments, one or more components in the on-demand service system 100 (e.g., the server 110, the requester terminal 130, the provider terminal 140, etc.)

may have permission to access the storage device 150. In some embodiments, the storage device 150 may be part of the server 110.

The positioning system 160 may determine information associated with an object, for example, the requester terminal 130, the provider terminal 140, etc. For example, the positioning system 160 may determine a current location of the requester terminal 130. In some embodiments, the positioning system 160 may be a global positioning system (GPS), a global navigation satellite system (GLONASS), a compass navigation system (COMPASS), a BeiDou navigation satellite system, a Galileo positioning system, a quasi-zenith satellite system (QZSS), etc. The information may include a location, an elevation, a velocity, or an acceleration of the object, or a current time. The location may be in the form of coordinates, such as, latitude coordinate and longitude coordinate, etc. The positioning system 160 may include one or more satellites, for example, a satellite 160-1, a satellite 160-2, and a satellite 160-3. The satellites 160-1 through 160-3 may determine the information mentioned above independently or jointly. The satellite positioning system 160 may send the information mentioned above to the network 120, the requester terminal 130, or the provider terminal 140 via wireless connections.

In some embodiments, information exchanging of one or more components in the on-demand service system 100 may be achieved by way of requesting a service. The object of the service request may be any product. In some embodiments, the product may be a tangible product or an immaterial product. The tangible product may include food, medicine, commodity, chemical product, electrical appliance, clothing, car, housing, luxury, or the like, or any combination thereof. The immaterial product may include a servicing product, a financial product, a knowledge product, an internet product, or the like, or any combination thereof. The internet product may include an individual host product, a web product, a mobile internet product, a commercial host product, an embedded product, or the like, or any combination thereof. The mobile internet product may be used in a software of a mobile terminal, a program, a system, or the like, or any combination thereof. The mobile terminal may include a tablet computer, a laptop computer, a mobile phone, a personal digital assistance (PDA), a smart watch, a point of sale (POS) device, an onboard computer, an onboard television, a wearable device, or the like, or any combination thereof. For example, the product may be any software and/or application used in the computer or mobile phone. The software and/or application may relate to socializing, shopping, transporting, entertainment, learning, investment, or the like, or any combination thereof. In some embodiments, the software and/or application relating to transporting may include a traveling software and/or application, a vehicle scheduling software and/or application, a mapping software and/or application, etc. In the vehicle scheduling software and/or application, the vehicle may include a horse, a carriage, a rickshaw (e.g., a wheelbarrow, a bike, a tricycle, etc.), a car (e.g., a taxi, a bus, a private car, etc.), a train, a subway, a vessel, an aircraft (e.g., an airplane, a helicopter, a space shuttle, a rocket, a hot-air balloon, etc.), or the like, or any combination thereof.

Figure 2:
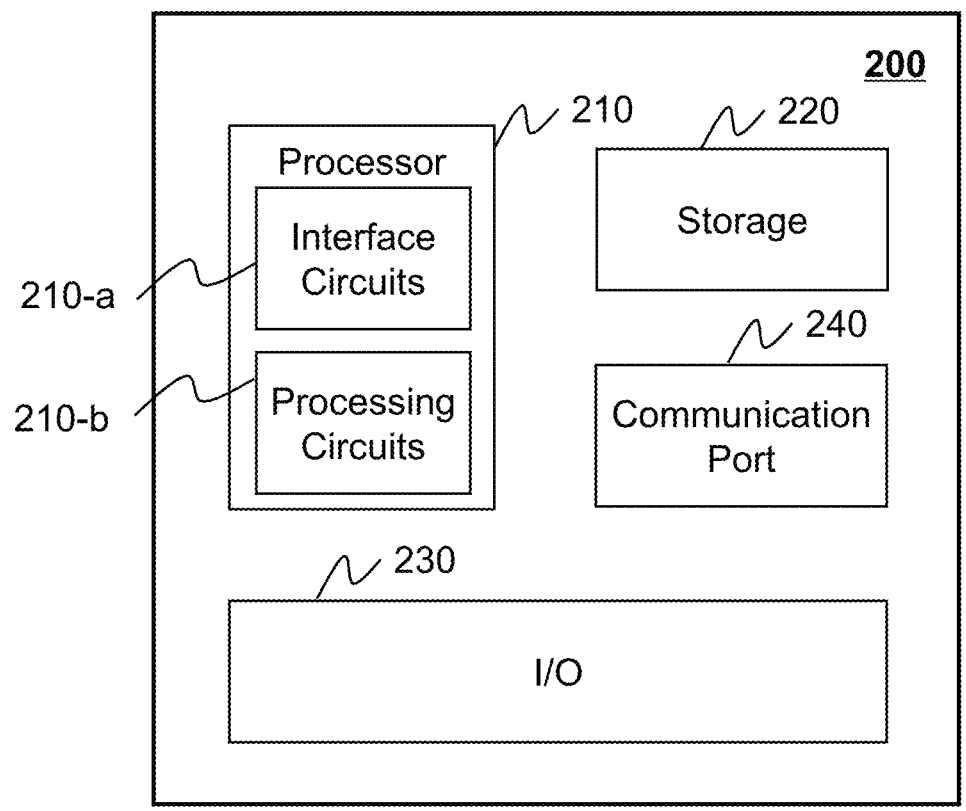
FIG. 2 is a schematic diagram illustrating exemplary hardware and/or software components of a computing device according to some embodiments of the present disclosure.

FIG. 2 is a schematic diagram illustrating exemplary hardware and/or software components of a computing device on which the processing engine 112 may be implemented according to some embodiments of the present disclosure. As illustrated in FIG. 2, the computing device 200 may include a processor 210, a storage 220, an input/output (I/O) 230, and a communication port 240.

The processor 210 (e.g., logic circuits) may execute computer instructions (e.g., program code) and perform functions of the processing engine 112 in accordance with techniques described herein. For example, the processor 210 may include interface circuits 210-*a* and processing circuits 210-*b* therein. The interface circuits may be configured to receive electronic signals from a bus (not shown in FIG. 2), wherein the electronic signals encode structured data and/or instructions for the processing circuits to process. The processing circuits may conduct logic calculations, and then determine a conclusion, a result, and/or an instruction encoded as electronic signals. Then the interface circuits may send out the electronic signals from the processing circuits via the bus.

The computer instructions may include, for example, routines, programs, objects, components, data structures, procedures, modules, and functions, which perform particular functions described herein. For example, the processor 210 may generate identification information of a service provider. In some embodiments, the processor 210 may include one or more hardware processors, such as a microcontroller, a microprocessor, a reduced instruction set computer (RISC), an application specific integrated circuits (ASICs), an application-specific instruction-set processor (ASIP), a central processing unit (CPU), a graphics processing unit (GPU), a physics processing unit (PPU), a microcontroller unit, a digital signal processor (DSP), a field programmable gate array (FPGA), an advanced RISC machine (ARM), a programmable logic device (PLD), any circuit or processor capable of executing one or more functions, or the like, or any combinations thereof.

Merely for illustration, only one processor is described in the computing device 200. However, it should be noted that the computing device 200 in the present disclosure may also include multiple processors, thus operations and/or method steps that are performed by one processor as described in the present disclosure may also be jointly or separately performed by the multiple processors. For example, if in the present disclosure the processor of the computing device 200 executes both step A and step B, it should be understood that step A and step B may also be performed by two or more different processors jointly or separately in the computing device 200 (e.g., a first processor executes step A and a second processor executes step B, or the first and second processors jointly execute steps A and B).

The storage 220 may store data/information obtained from the requester terminal 130, the provider terminal 140, the storage device 150, and/or any other component of the on-demand service system 100. In some embodiments, the storage 220 may include a mass storage, a removable storage, a volatile read-and-write memory, a read-only memory (ROM), or the like, or any combination thereof. For example, the mass storage may include a magnetic disk, an optical disk, a solid-state drives, etc. The removable storage may include a flash drive, a floppy disk, an optical disk, a memory card, a zip disk, a magnetic tape, etc. The volatile read-and-write memory may include a random access memory (RAM). The RAM may include a dynamic RAM (DRAM), a double date rate synchronous dynamic RAM (DDR SDRAM), a static RAM (SRAM), a thyristor RAM (T-RAM), and a zero-capacitor RAM (Z-RAM), etc. The ROM may include a mask ROM (MROM), a programmable ROM (PROM), an erasable programmable ROM (EPROM), an electrically erasable programmable ROM (EEPROM), a compact disk ROM (CD-ROM), and a digital versatile disk ROM, etc. In some embodiments, the storage 220 may store one or more programs and/or instructions to perform exemplary methods described in the present disclosure. For example, the storage 220 may store a program for the processing engine 112 for generating identification information of a service provider.

The I/O 230 may input and/or output signals, data, information, etc. In some embodiments, the I/O 230 may enable a user interaction with the processing engine 112. In some embodiments, the I/O 230 may include an input device and an output device. Examples of the input device may include a keyboard, a mouse, a touch screen, a microphone, or the like, or a combination thereof. Examples of the output device may include a display device, a loudspeaker, a printer, a projector, or the like, or a combination thereof. Examples of the display device may include a liquid crystal display (LCD), a light-emitting diode (LED)-based display, a flat panel display, a curved screen, a television device, a cathode ray tube (CRT), a touch screen, or the like, or a combination thereof.

The communication port 240 may be connected to a network (e.g., the network 120) to facilitate data communications. The communication port 240 may establish connections between the processing engine 112 and the requester terminal 130, the provider terminal 140, the positioning system 160, or the storage device 150. The connection may be a wired connection, a wireless connection, any other communication connection that can enable data transmission and/or reception, and/or any combination of these connections. The wired connection may include, for example, an electrical cable, an optical cable, a telephone wire, or the like, or any combination thereof. The wireless connection may include, for example, a Bluetooth™ link, a Wi-Fi™ link, a WiMax™ link, a WLAN link, a ZigBee link, a mobile network link (e.g., 3G, 4G, 5G, etc.), or the like, or a combination thereof. In some embodiments, the communication port 240 may be and/or include a standardized communication port, such as RS232, RS485, etc.

Figure 3:
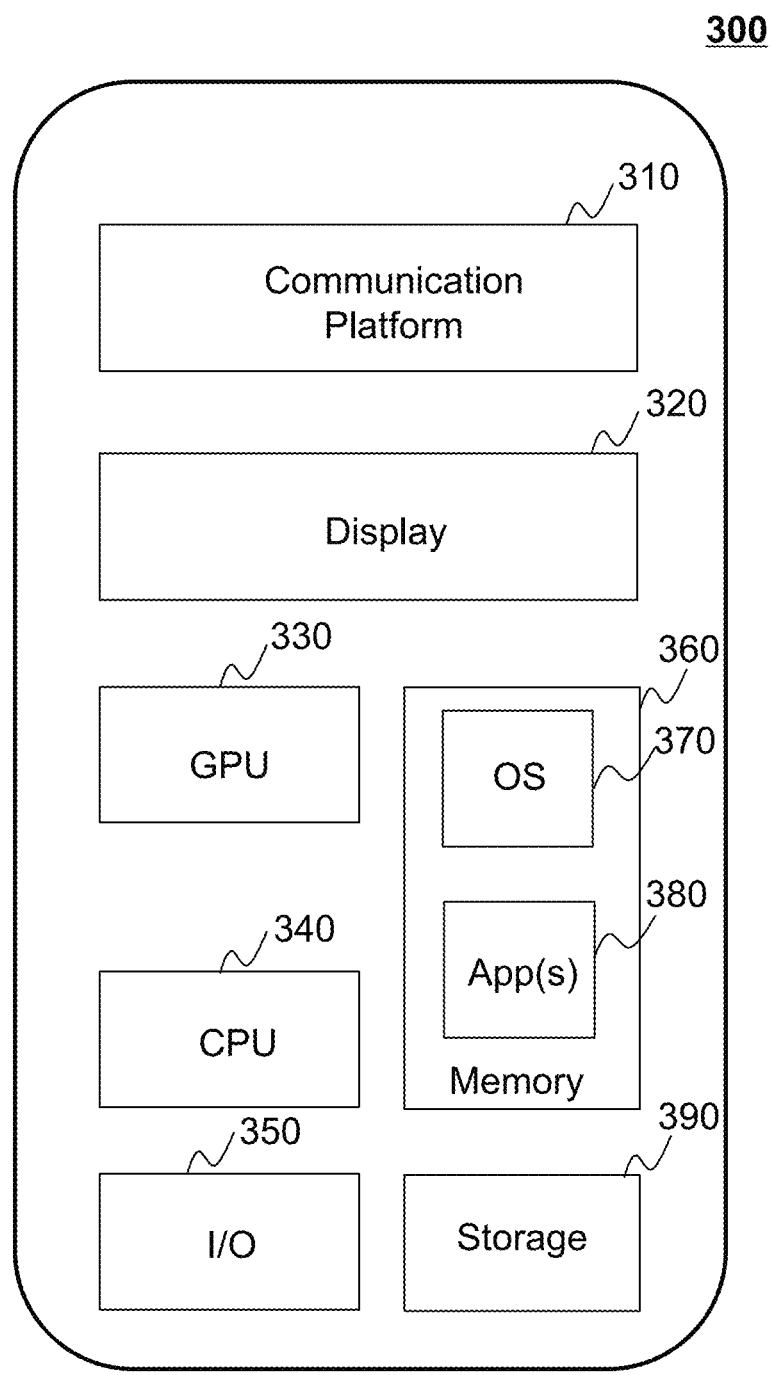
FIG. 3 a schematic diagram illustrating exemplary hardware and/or software components of a mobile device according to some embodiments of the present disclosure.

FIG. 3 a schematic diagram illustrating exemplary hardware and/or software components of a mobile device on which the requester terminal 130 and/or the provider terminal 140 may be implemented according to some embodiments of the present disclosure. As illustrated in FIG.3, the mobile device 300 may include a communication platform 310, a display 320, a graphic processing unit (GPU) 330, a central processing unit (CPU) 340, an I/O 350, a memory 360, and a storage 390. In some embodiments, any other suitable component, including but not limited to a system bus or a controller (not shown), may also be included in the mobile device 300. In some embodiments, a mobile operating system (OS) 370 (e.g., iOS™, Android™, Windows Phone™, etc.) and one or more applications 380 may be loaded into the memory 360 from the storage 390 in order to be executed by the CPU 340. The applications 380 may include a browser or any other suitable mobile apps for receiving and rendering information relating to an online carpooling transportation service or other information from the processing engine 112, and sending information relating to an online carpooling transportation service or other information to the processing engine 112. User interactions with the information stream may be achieved via the I/O 350 and provided to the processing engine 112 and/or other components of the system 100 via the network 120.

One of ordinary skill in the art would understand that when an element of the on-demand service system 100 performs, the element may perform through electrical signals and/or electromagnetic signals. For example, when the processing engine 112 processes a task, such as making a determination, or identifying information, the processing engine 112 may operate logic circuits in its processor to process such task. When the processing engine 112 sends out data (e.g., identification information of a service provider) to the requester terminal 130 and/or the provider terminal 140, a processor of the processing engine 112 may generate electrical signals encoding the data. The processor of the processing engine 112 may then send the electrical signals to an output port of the processing engine 112. If the requester terminal 130 and/or the provider terminal 140 communicate with the processing engine 112 via a wired network, the output port of the processing engine 112 may be physically connected to a cable, which may further transmit the electrical signals to an input port of the requester terminal 130 and/or the provider terminal 140. If the requester terminal 130 and/or the provider terminal 140 communicate with the processing engine 112 via a wireless network, the output port of the processing engine 112 may be one or more antennas, which may convert the electrical signals to electromagnetic signals. Within an electronic device, such as the requester terminal 130, the provider terminal 140, or the server 110, when a processor thereof processes an instruction, sends out an instruction, and/or performs an action, the instruction and/or action is conducted via electrical signals. For example, when the processor retrieves or saves data from a storage medium (e.g., the storage device 150, the storage 220), it may send out electrical signals to a read/write device of the storage medium, which may read or write structured data in the storage medium. The structured data may be transmitted to the processor in the form of electrical signals via a bus of the electronic device. Here, an electrical signal may refer to one electrical signal, a series of electrical signals, and/or a plurality of discrete electrical signals.

Figure 4:
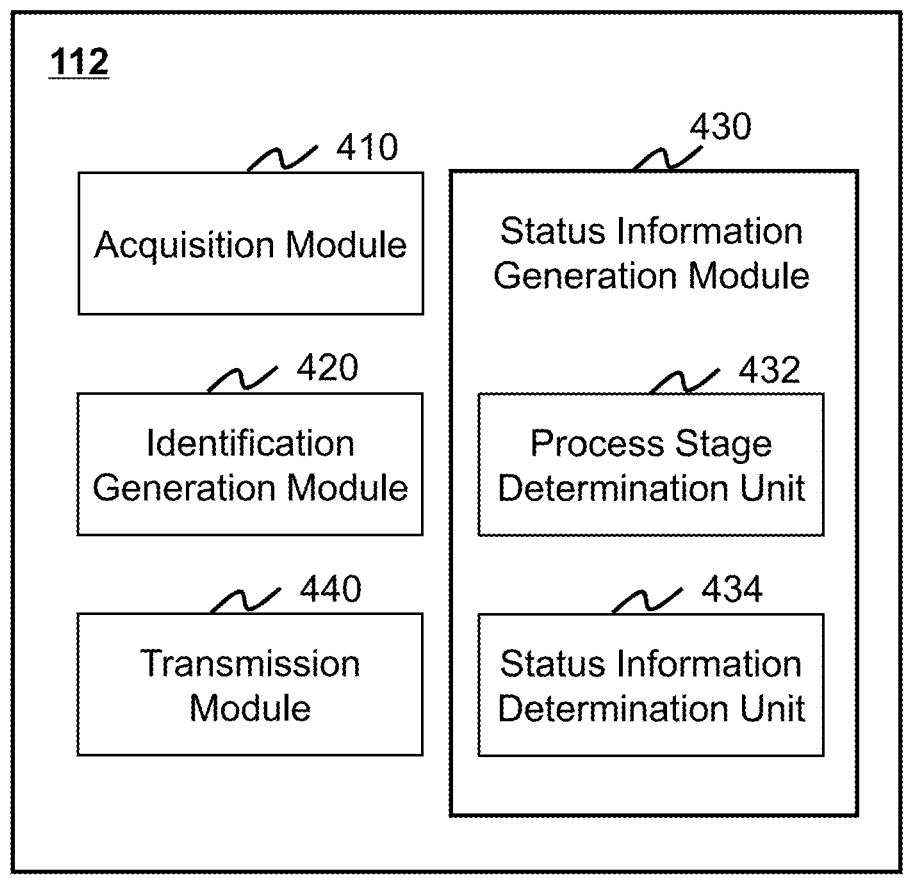
FIG. 4 is a block diagram illustrating an exemplary processing engine according to some embodiments of the present disclosure.

FIG. 4 is a block diagram illustrating an exemplary processing engine according to some embodiments of the present disclosure. The processing engine 112 may include an acquisition module 410, an identification generation module 420, a status information generation module 430, and a transmission module 440.

The acquisition module 410 may be configured to acquire data relating to the on-demand service (e.g., the taxi service). In some embodiments, the acquisition module 410 may receive confirmation that a service provider has accepted a service request from a service requester. The service request may include a pickup location, a destination, a departure time, or the like, or any combination thereof. In some embodiments, the acquisition module 410 may acquire feature information associated with the service provider from the storage medium (e.g., the storage device 150, the storage 220) and/or the provider terminal 140. In some embodiments, the feature information may include information that may help the service requestor to identify the service provider and/or the vehicle (referred to as "first vehicle") associated with the service provider. In certain embodiments, the feature information may include but not limited to a type of a first vehicle associated with the service provider, a color of the first vehicle, a plate number of the first vehicle, a mark on a surface of the first vehicle, a position of the first vehicle, a direction that the first vehicle is heading, or the like, or any combination thereof. In some embodiments, the acquisition module 410 may acquire surrounding information associated with the service provider. In some embodiments, the surrounding information may include information related to the surroundings of the service requestor, such as but not limited to surrounding vehicle information, surrounding building information (e.g., building position, building size, building height, etc.), surrounding landscape information (e.g., landscape position, landscape size, landscape height, etc.), surrounding event (e.g. sports event or concert) information, surrounding road information (e.g., road name, road position, road width, etc.), or the like, or any combination thereof. In certain embodiments, the surrounding information may include but not be limited to one or more positions of one or more second vehicles that are within a predetermined area, a type of at least one of the one or more second vehicles, a color of the at least one of the one or more second vehicles, a plate number of the at least one of the one or more second vehicles, or the like, or any combination thereof. In some embodiments, the acquisition module 410 may acquire a position of the service requester and a direction that the service requester faces from the storage medium (e.g., the storage device 150, the storage 220) and/or the requester terminal 130.

The identification generation module 420 may be configured to generate identification information of the service provider. In some embodiments, the identification generation module 420 may generate the identification information of the service provider based on the feature information and/or the surrounding information. The identification information may be any information that may help the service requester to identify the service provider (e.g., the first vehicle associated the service provider). In some embodiments, the identification information may include but not limited to the feature information associated with the service provider, the surrounding information associated with the service provider, or the like, or any combination thereof. In certain embodiments, the identification information includes only the feature information; in certain embodiments, the identification information includes only the surrounding information; in certain embodiments, the identification information includes the feature information and the surrounding information. In some embodiments, the identification generation module 420 may generate an image of the first vehicle showing part or all of the feature information associated with the service provider and/or the surrounding information associated with the service provider. Alternatively or additionally, the identification generation module 420 may generate a map showing part or all of the feature information associated with the service provider and/or part or all of the surrounding information associated with the service provider.

The status information generation module 430 may include a process stage determination unit 432 and a status information determination unit 434. In some embodiments, the process stage determination unit 432 may be configured to determine a process stage that the on-demand service is in based on the position of the service provider. In some embodiments, the process stage may include, for example, four stages (e.g., a first stage, a second stage, a third stage, and a fourth stage). In the first stage, the service provider may have not arrived at the pickup location, and a route distance between the position of the service provider and the pickup location may be longer than a first threshold (e.g., 200 meters) or a travel time from the position of the service provider to the pickup location may be longer than a second threshold (e.g., 2 minutes). The route distance between the position of the service provider and the pickup location refers to the length of a route from the position of the service provider to the pickup location. In certain embodiments, for the first stage, the service requester would like to know where the service provider is and how long it will be before the service provider's arrival. In the second stage, the route distance between the position of the service provider and the pickup location may be shorter than the first threshold or the travel time from the position of the service provider to the pickup location may be shorter than the second threshold. In certain embodiments, for the second stage, the service requester mainly focuses on finding the vehicle associated with the service provider. In the third stage, the service provider may be traveling to the destination of the service requester, and a route distance between the position of the service provider and the destination may be longer than a third threshold (e.g., 1 kilometer) or a travel time from the position of the service provider to the destination may be longer than a fourth threshold (e.g., 5 minutes). In the fourth stage, the service provider may be traveling to the destination of the service requester, and the route distance between the position of the service provider and the destination may be shorter than the third threshold or the travel time from the position of the service provider to the destination may be shorter than the fourth threshold.

The status information determination unit 434 may be configured to determine status information of the service provider. In some embodiments, the status information of the service provider may correspond to the process stage that the on-demand service is in. In certain embodiments, the status information corresponding to the first stage may include but not be limited to the route distance between the position of the service provider and the pickup location, the travel time from the position of the service provider to the pickup location, an estimated time of arrival to the pickup location, a route from the position of the service provider to the pickup location, the pickup location, the feature information associated with the service provider (e.g., the position of the service provider, a type of a vehicle associated with the service provider, a color of the vehicle, a plate number of the vehicle, etc.), the position of the service provider, and/or the position of the service requester, or the like, or any combination thereof. In certain embodiments, the status information corresponding to the second stage may include but not be limited to the feature information associated with the service provider (e.g., the type of the vehicle associated with the service provider, the color of the vehicle, the plate number of the vehicle, the position of the service provider, etc.), the surrounding information (e.g., as described in connection with FIG. 5) associated with the service provider, the identification information associated with the service provider, the pickup location, the position of the service provider, and/or the position of the service requester, or the like, or any combination thereof. In certain embodiments, the status information corresponding to the third stage may include but not be limited to the route distance between the position of the service provider and the destination, the travel time from the position of the service provider to the destination, the destination, an estimated time of arrival to the destination, the position of the service provider, a route from the pickup location to the destination, a road condition from the pickup location to the destination, and/or an estimated price of the service request, or the like, or any combination thereof. In certain embodiments, the status information corresponding to the fourth stage may include but not be limited to the position of the service provider, the destination, and/or the estimated price of the service request, or the like, or any combination thereof.

The transmission module 440 may be configured to transmit data relating to the on-demand service (e.g., the online taxi service) to an electronic device associated with the service requester (e.g., the requester terminal 130) and/or to an electronic device associated with the service provider or potential service providers. In some embodiments, the transmission module 440 may transmit the identification information of the service provider to the requester terminal 130. In some embodiments, the transmission module 440 may transmit the status information to the requester terminal 130. In some embodiments, the transmission module 440 may send a display instruction to the requester terminal 130. In certain embodiments, the display instruction may prompt the requester terminal 130 to display the identification information and/or the status information on a lock screen interface of the requester terminal 130 when the requester terminal 130 is locked.

In some embodiments, the identification generation module 420 or the status information generation module 430 may be omitted.

The modules in the processing engine 112 may be connected to or communicate with each other via a wired connection or a wireless connection. The wired connection may include a metal cable, an optical cable, a hybrid cable, or the like, or any combination thereof. The wireless connection may include a Local Area Network (LAN), a Wide Area Network (WAN), a Bluetooth, a ZigBee, a Near Field Communication (NFC), or the like, or any combination thereof. Two or more of the modules may be combined as a single module, and any one of the modules may be divided into two or more units. For example, the acquisition module 410 may be integrated with the transmission module 440 as a single module which may acquire and transmit data. As another example, the identification generation module 420 may be divided into two units. The first unit may be configured to generation an image showing the feature information associated with the service provider and/or the surrounding information associated with the service provider. The second unit may be configured to generate a map showing the feature information associated with the service provider and/or the surrounding information associated with the service provider.

Figure 5:
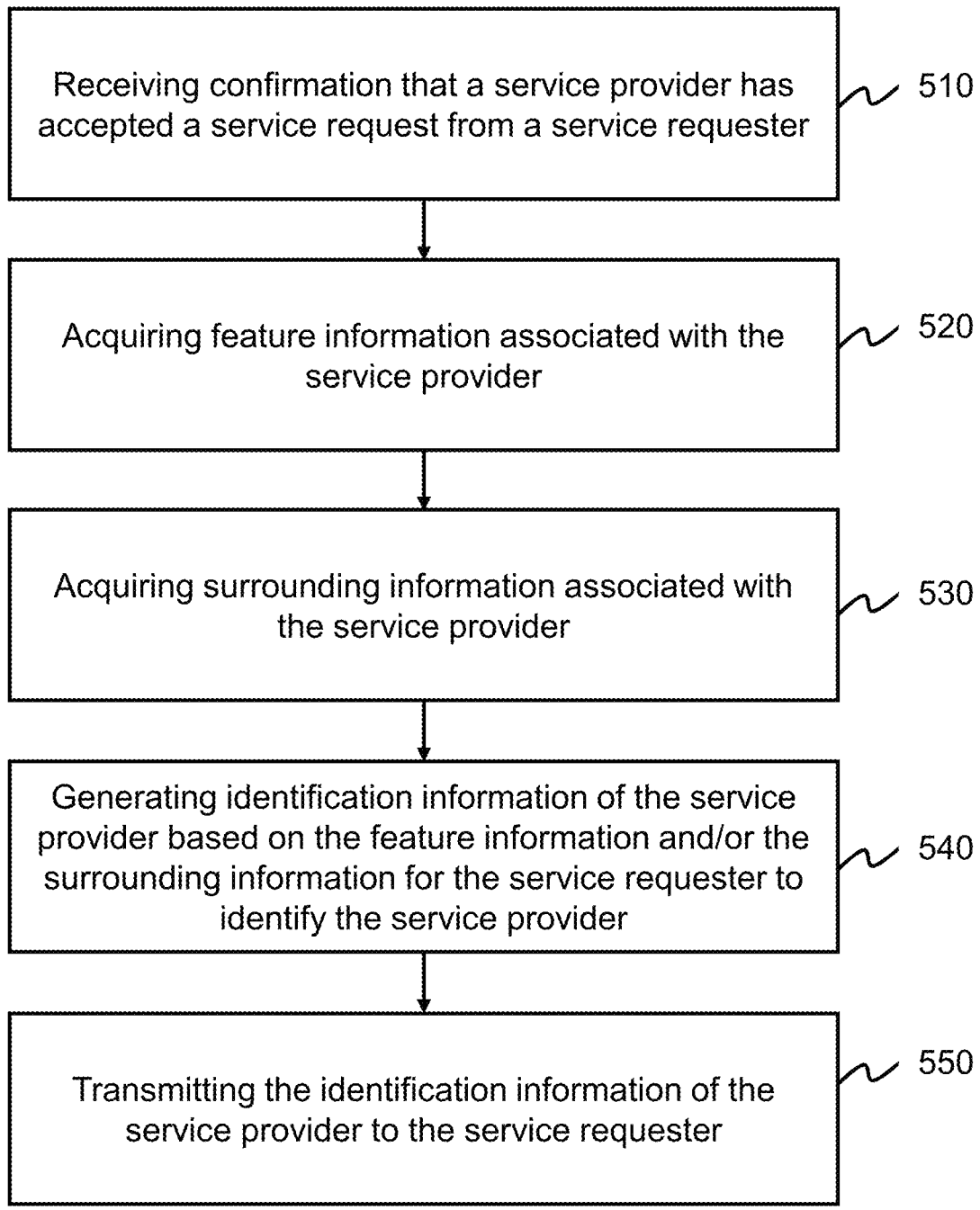
FIG. 5 is a flowchart illustrating an exemplary process for generating identification information of a service provider according to some embodiments of the present disclosure.

FIG. 5 is a flowchart illustrating an exemplary process for generating identification information of a service provider according to some embodiments of the present disclosure. The process 500 may be implemented in the on-demand service system 100 illustrated in FIG. 1. For example, the process 500 may be stored in the storage device 150 and/or the storage 220 as a form of instructions (e.g., an application), and invoked and/or executed by the server 110 (e.g., the processing engine 112 of the server 110, the processor 220 illustrated in FIG. 2, or one or more modules in the processing engine 112 illustrated in FIG. 4). The operations of the illustrated process presented below are intended to be illustrative. In some embodiments, the process 500 may be accomplished with one or more additional operations not described, and/or without one or more of the operations discussed. Additionally, the order in which the operations of the process 500 as illustrated in FIG. 5 and described below is not intended to be limiting.

In 510, the processing engine 112 (e.g., the processing circuits of the processing engine 112, the acquisition module 410) may receive confirmation that a service provider has accepted a service request (e.g., a taxi service request) from a service requester. In some embodiments, the confirmation may be received from the provider terminal 140. The processing engine 112 may receive the confirmation through the network 120. The service request may include a pickup location, a destination, a departure time, or the like, or any combination thereof. In some embodiments, the processing engine 112 may receive additional confirmation that the acceptance of the service provider is approved by the service requester.

In some embodiments, the requester terminal 130 and the provider terminal 140 may establish a communication (e.g., a wireless communication) with the processing engine 112, via an application installed in the requester terminal 130 and the provider terminal 140, respectively. In some embodiments, the application may relate to the on-demand service. The service requester may input the service request through an interface of the application installed in the requester terminal 130 and send the service request to the processing engine 112. When receiving the service request from the service requester, the processing engine 112 may find a service provider for the service requester, and send the service request to the provider terminal 140 associated with the service provider. The service provider may accept the service request through an interface of the application installed in the provider terminal 140. For example, the service provider may press a button on the interface of the application to accept the service request. After the service provider accepts the service request, the processing engine 112 may receive the confirmation that the service provider has accepted the service request. In some embodiments, after receiving the confirmation that the service provider has accepted the service request from the service requester, the processing engine 112 may perform 520-550.

In some embodiments, the processing engine starts to perform 520-550 immediately after receiving the confirmation that the service provider has accepted the service request. In some embodiments, the processing engine only starts to perform 520-550 after additional confirmation is received. In certain embodiments, the processing engine 112 may starts 520-550 after receiving confirmation that the service provider has arrived at the pickup location, in the vicinity of the pickup location, or within a specific distance from the pickup location. For example, the service provider may press a button on the interface of the application to confirm that the service provider has arrived at the pickup location when the service provider has arrived at the pickup location or the service provider will arrive at the pickup location soon (e.g., 50 meters left to arrive at the pickup location, or 30 seconds left to arrive at the pickup location). After the service provider confirms that the service provider has arrived at the pickup location, the processing engine 112 may receive the confirmation that the service provider has arrived at the pickup location. After receiving the confirmation that the service provider has arrived at the pickup location, the processing engine 112 may perform 520-550.

In 520, the processing engine 112 (e.g., the processing circuits of the processing engine 112, the acquisition module 410) may acquire feature information associated with the service provider. The feature information may relate to a first vehicle associated with the service provider (e.g., a vehicle of a driver). In some embodiments, the feature information may include but not be limited to a type (e.g., Toyota Camry™) of the first vehicle, a color of the first vehicle (e.g., white, black, red, green, yellow, blue, etc.), a plate number of the first vehicle, a mark on a surface of the first vehicle, a position of the first vehicle, a direction that the first vehicle faces, or the like, or any combination thereof. In certain embodiments, the plate number of the first vehicle may include but not be limited to all characters of the plate number, the first character of the plate number, the first two characters of the plate number, the last character of the plate number, the last two characters of the plate number, the last three characters of the plate number, the last four characters of the plate number, or the like, or any combination thereof. In certain embodiments, the mark on the surface of the first vehicle may include but not limited to a tag, a paste, a decoration, an appendage, or the like, or any combination thereof. For example, the mark on the surface of the first vehicle may be a yellow flag inserted in a rearview mirror of the first vehicle.

In some embodiments, a user of the provider terminal 140 (e.g., the service provider) may input the feature information, including but not limited to any or all of the type of the first vehicle, the color of the first vehicle, the plate number of the first vehicle, or the mark on the surface of the first vehicle, through the interface of the application installed in the provider terminal 140. For example, the user of the provider terminal 140 may input the type of the first vehicle, the color of the first vehicle, the plate number of the first vehicle, or the mark on the surface of the first vehicle through the interface of the application installed in the provider terminal 140 when the user registers an account of the application. In some embodiments, the provider terminal 140 may send the feature information (e.g., type of the first vehicle, the color of the first vehicle, the plate number of the first vehicle, or the mark on the surface of the first vehicle) to the processing engine 112. In certain embodiments, the processing engine 112 may store the feature information (e.g., the type of the first vehicle, the color of the first vehicle, the plate number of the first vehicle, or the mark on the surface of the first vehicle) in the storage medium (e.g., the storage device 150, the storage 220). In certain embodiments, the processing engine 112 may access the storage medium to acquire the feature information (e.g., the type of the first vehicle, the color of the first vehicle, the plate number of the first vehicle, or the mark on the surface of the first vehicle). In certain embodiments, the service provider may utilize an alternative process to input the feature information. For example, the service provider may take one or more pictures of the first vehicle and send the pictures, through the provider terminal 140, to the processing engine 112, which may process the pictures and extract the feature information (e.g., the type of the first vehicle, the color of the first vehicle, the plate number of the first vehicle, or the mark on the surface of the first vehicle).

When a service provider provides an on-demand transportation service (e.g., the taxi service) using a vehicle, the service provider and the provider terminal 140 may move together with the vehicle. In the present disclosure, the position of a service provider and a position of a vehicle associated with the service provider may be the same as the position of the provider terminal 140. The direction that a service provider faces and the direction that a vehicle associated with the service provider faces may also be the same.

In some embodiments, the position of the first vehicle may include a real-time position of the first vehicle. The direction that the first vehicle faces may include but not limited to north, south, east, west, north-east, north-west, south-east, south-west, or the like, or any combination thereof. The direction that the first vehicle faces may be a real-time direction. In certain embodiments, the direction the first vehicle faces is the direction the first vehicle is heading to.

The position of the first vehicle and the direction that the first vehicle faces may be obtained through a positioning technology in the provider terminal 140, for example, a GPS, a GLONASS, a COMPASS, a QZSS, a WiFi positioning technology, or the like, or any combination thereof. The application installed in the provider terminal 140 may direct the provider terminal 140 to constantly send the real-time position of the first vehicle and the real-time direction that the first vehicle faces to the processing engine 112. Consequently, the processing engine 112 may acquire the position of the first vehicle and the direction that the first vehicle faces in real-time or substantially real-time.

In 530, the processing engine 112 (e.g., the processing circuits of the processing engine 112, the acquisition module 410) may acquire surrounding information associated with the service provider. In some embodiments, the surrounding information may include but not be limited to information related to the surroundings of the service requestor, such as but not limited to surrounding vehicle information, surrounding building information (e.g., building position, building size, building height, etc.), surrounding landscape information (e.g., landscape position, landscape size, landscape height, etc.), surrounding event (e.g. sports event or concert) information, surrounding road information (e.g., road name, road position, road width, etc.), or the like, or any combination thereof. In some embodiments, the surrounding information may include but not be limited to one or more positions (e.g., real-time positions) of one or more second vehicles that are within a predetermined area, a type of at least one of the one or more second vehicles, a color of the at least one of the one or more second vehicles, a plate number of the at least one of the one or more second vehicles, or the like, or any combination thereof.

The predetermined area may have any shape and/or size. In some embodiments, the predetermined area may be a circle area that includes the service requester and the first vehcile, and have a diameter of a straight-line distance between the service requester and the first vehicle. In some embodiments, the predetermined area may be a circle area that has a center at the position of the first vehicle and a radius equal to the distance between the first vehcile and the service requestor. In some embodiments, the predetermined area may be a circle area that has a center at the position of the service requestor and a radius equal to the distance between the first vehcile and the service requestor. In some embodiments, the predetermined area may be a circle area that has a center at the position of the first vehicle and a radius equal to twice of the distance between the first vehcile and the service requestor. In some embodiments, the predetermined area may be a circle area that has a center at the position of the service requestor and a radius equal to twice of the distance between the first vehcile and the service requestor. In some embodiments, the predetermined area may be a square or rectangle that can be optimized for showing on the screen of the requestor terminal. In certain embodiments, the size of the seqare or rectangle may be varied but all include both the first vehicle and the service requestor.

The one or more second vehicles may be a reference to help the service requester identify the first vehicle. In some embodiments, the second vehicles include all the vehicles in the predetermined area In some embodiments, the processing engine 112 may select one or more vehicles of which the speeds are lower than a speed threshold (e.g., 10 km/h) as the second vehicles. In certain embodiments, the second vehicles include all the vehicles in the predetermine area that are registered with a same online service as the first vehicle.

In some embodiments, information related to the second vehicles, including but not limited to the type of at least one of the one or more second vehicles, the color of at least one of the one or more second vehicles, and plate number of the at least one of the one or more second vehicles may be stored in the storage medium (e.g., the storage device 150, the storage 220, etc.). In some embodiments, the processing engine 112 may access the storage medium to read/write the information related to the second vehicles (e.g., type of the at least one of the one or more second vehicles, the color of the at least one of the one or more second vehicles, or the plate number of the at least one of the one or more second vehicles) to generate the surrounding information and help the service requestor to identify the first vehicle.

In 540, the processing engine 112 (e.g., the processing circuits of the processing engine 112, the identification generation module 420) may generate identification information of the service provider based on the feature information and/or the surrounding information for the service requester to identify the service provider. The identification information may be any information that may help the service requester to identify the service provider (e.g., the first vehicle associated with the service provider). The identification information may include but not limited to the feature information associated with the service provider, the surrounding information associated with the service provider, or the like, or any combination thereof.

In some embodiments, the identification information may include part or all of the feature information and/or the surrounding information. In some embodiments, the identification information may be texts, images, videos, or other forms description, or any combinations thereof, that includes part and/or all of the feature information or the surrounding information. In certain embodiments, the identification information may include a brief description of the first vehicle. In certain embodiments, the identification information of the service provider may include an image of the first vehicle. The image may be a two-dimensional (2D) image or a three-dimensional (3D) image. The image of the first vehicle may show the part or all of the feature information and/or the surrounding information.

In some embodiments, the image of the first vehicle may show the type of the first vehicle, the color of the first vehicle, the plate number of the first vehicle, the mark on the surface of the first vehicle, or the like, or any combination thereof.

It is not required that the image of the first vehicle is a photograph of the first vehicle. In some embodiments, the image of the first vehicle is an image that shows part or all of the feature information related to the first vehicle. In some embodiments, the image of the first vehicle is constructed based on a template. For example, the processing engine 112 may acquire a vehicle template from the storage medium (e.g., the storage device 150, or the storage 220) based on the type of the first vehicle. The processing engine 112 may fill the vehicle template with the color of the first vehicle, add the plate number of the first vehicle and/or the mark on the surface of the first vehicle to the template, and generate the image of the first vehicle.

In some embodiments, the processing engine 112 may generate the image of the first vehicle showing the first vehicle from one or more perspectives. For example, the image may include a prospective view of the first vehicle, a front view of the first vehicle, a rear view of the first vehicle, a side view of the first vehicle, a top view of the first vehicle, or the like, or any combination thereof.

Figure 6:
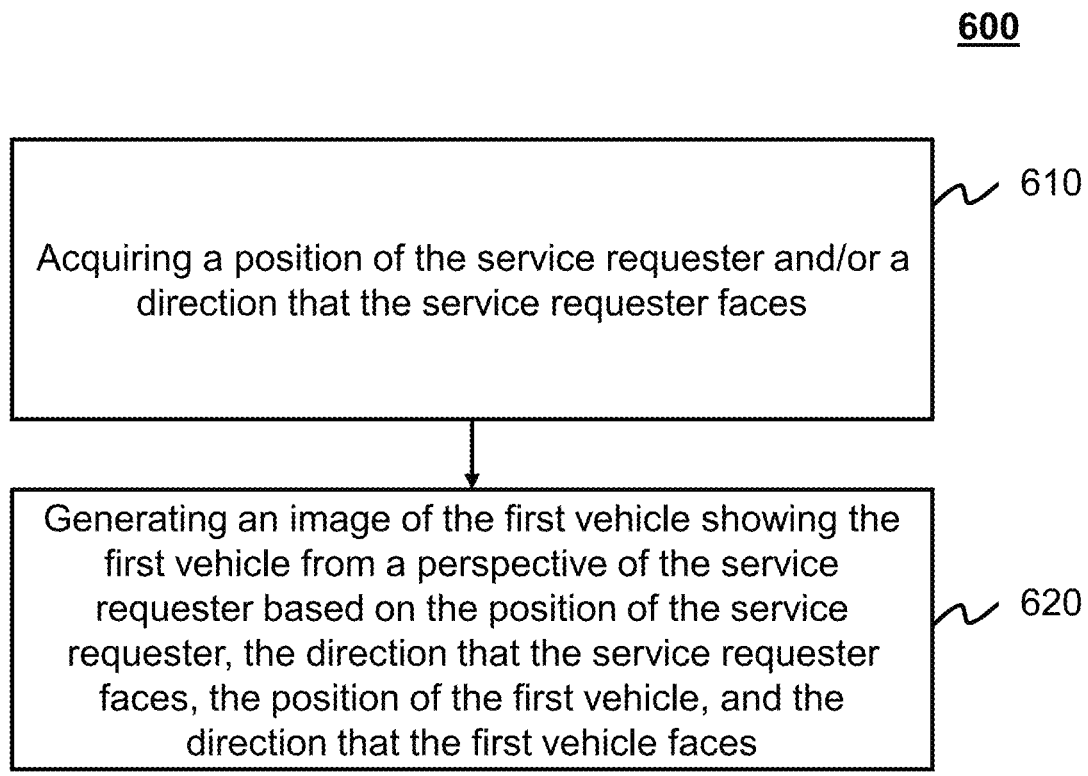
FIG. 6 is a flowchart illustrating an exemplary process for generating an image of a first vehicle associated with a service provider according to some embodiments of the present disclosure.

In some embodiments, the processing engine 112 may generate the image of the first vehicle showing the first vehicle from a perspective of the service requester based on the position of the service requester, the direction that the service requester faces, the position of the first vehicle, and the direction that the first vehicle faces (e.g., the description in connection with FIG. 6). In certain embodiments, such an approach may create a visual notification to the service requestor as to where the first vehicle is, allowing the service requestor to identify the first vehicle through a direct comparison of the image on the screen and the vehicle from his/her own perspective.

In some embodiments, the processing engine 112 may generate the image showing not only the first vehicle but also the one or more second vehicles, from the perspective of the service requestor. In addition to the features associated with the first vehicle, the image may also show the type of at least one of the one or more second vehicles, the color of the at least one of the one or more second vehicles, or the plate number of the at least one of the one or more second vehicles. In certain embodiments, the first vehicle may be highlighted in the image. For example, the first vehicle may be bigger than the one or more second vehicles in the image, or the first vehicle may be marked with an arrow or any type of pointer.

In some embodiments, the identification information of the service provider may include a map, which is based on the feature information and/or the surrounding information. The map may be a 2D map or a 3D map. The map may show part or all of the feature information and/or the surrounding information.

In some embodiments, the map may show the position (e.g., the real-time position) of the first vehicle and the one or more positions (e.g., the real-time positions) of the one or more second vehicles that are within the predetermined area. The first vehicle may be highlighted on the map. For example, the icon of the first vehicle may be bigger than one or more icons of the one or more second vehicles, or the icon of the first vehicle may be marked with an arrow or any type of pointer.

In some embodiments, the map may show a route from the position of the service requester to the position of the first vehicle. In some embodiments, the map may show the type of the first vehicle, the color of the first vehicle, the plate number of the first vehicle, and/or the mark on the surface of the first vehicle in the form of text, image, voice, video, or the like, or any combination thereof. For example, the map may include an image of the first vehicle, which is illustrated above, showing the type of the first vehicle, the color of the first vehicle, the plate number of the first vehicle, or the mark on the surface of the first vehicle. As another example, the map may include an image of the first vehicle, which is illustrated above, showing the first vehicle from a perspective of the service requester. At least one of the position of the first vehicle, the type of the first vehicle, the brand of the first vehicle, the color of the first vehicle, the plate number of the first vehicle, and the mark on the surface of the first vehicle may be highlighted on the map to help the service requester identify the first vehicle.

In some embodiments, the map may show the type of the at least one of the one or more second vehicles, the color of the at least one of the one or more second vehicles, the plate number of the at least one of the one or more second vehicles in the form of text, image, voice, video, or the like, or any combination thereof.

In some embodiments, the processing engine 112 may determine route distances between the first vehicle and each of the one or more second vehicles. The processing engine 112 may select one of the one or more second vehicles. The route distance between the first vehicle and the selected second vehicle may be the minimum among the route distances between the first vehicle and each of the one or more second vehicles. The processing engine 112 may determine whether the selected second vehicle is on the route from the service requester to the first vehicle. The processing engine 112 may show the type of the selected second vehicle, the color of the selected second vehicle, or the plate number of the selected second vehicle on the map in response to a determination that the selected second vehicle is on the route from the service requester to the first vehicle, which may reduce the interference of the selected second vehicle on the identification of the first vehicle and help the service requester identify the first vehicle easily and quickly.

In 550, the processing engine 112 (e.g., the processing circuits of the processing engine 112, the transmission module 440) may transmit the identification information of the service provider to the service requester. In some embodiments, the processing engine 112 may transmit the identification information of the service provider to the requester terminal 130 via the network 120. In some embodiments, the identification information may be displayed on a screen of the requester terminal 130. In some embodiments, the processing engine 112 may send a display instruction along with the identification information to the requester terminal 130. The display instruction may prompt the requester terminal 130 to display all or part of the identification information. In certain embodiments, the display instruction may prompt the requester terminal 130 to display all or part of the identification information on a lock screen interface of the requester terminal 130 when the requester terminal 130 is in a locked mode.

In some embodiments, because the position of the first vehicle and/or the positions of the one or more second vehicles may be changing, the processing engine 112 may update the map at predetermined intervals (e.g., every 1, 2, 3, 4, 5, 10, 15, 20, 30, 60, 120, or 180 seconds) by repeating steps 520-550. In certain embodiments, the specific interval may be adjusted based on the distance between the service requester and the first vehicle (e.g., 10 seconds when the distance is more than 1000 meters and 3 seconds when the distance is less than 1000 meters).

In some embodiments, the identification information may include only the feature information, not the surrounding information. For example, in certain embodiments, when the processing engine 112 generates the image of the first vehicle showing the type of the first vehicle, the color of the first vehicle, the plate number of the first vehicle, or the mark on the surface of the first vehicle, the processing engine 112 may omit the operation of 530.

In some embodiments, the identification information may include only the surrounding information, not the feature information. For example, when the processing engine 112 generates the map that includes the first vehicle and one or more second vehicles, the processing engine 112 may omit the operation of 520.

It should be noted that the above description is merely provided for the purposes of illustration, and not intended to limit the scope of the present disclosure. For persons having ordinary skills in the art, multiple variations and modifications may be made under the teachings of the present disclosure. However, those variations and modifications do not depart from the scope of the present disclosure. For example, one or more other optional steps (e.g., a storing step) may be added elsewhere in the exemplary process 500. In the storing step, the processing engine 112 may store the feature information associated with the service provider, the surrounding information associated with the service provider, and/or the identification information of the service provider in the storage medium (e.g., the storage device 150, or the storage 220) disclosed elsewhere in the present disclosure.

FIG. 6 is a flowchart illustrating an exemplary process for generating an image of a first vehicle associated with a service provider according to some embodiments of the present disclosure. The process 600 may be implemented in the on-demand service system 100 illustrated in FIG. 1. For example, the process 600 may be stored in the storage device 150 and/or the storage 220 as a form of instructions (e.g., an application), and invoked and/or executed by the server 110 (e.g., the processing engine 112 of the server 110, the processor 220 illustrated in FIG. 2, or one or more modules in the processing engine 112 illustrated in FIG. 4A). The operations of the illustrated process presented below are intended to be illustrative. In some embodiments, the process 600 may be accomplished with one or more additional operations not described, and/or without one or more of the operations discussed. Additionally, the order in which the operations of the process 600 as illustrated in FIG. 6 and described below is not intended to be limiting. In some embodiments, step 540 illustrated in FIG. 5 may be performed according to the process 600.

In 610, the processing engine 112 (e.g., the processing circuits of the processing engine 112, the acquisition module 410) may acquire a position of the service requester and/or a direction that the service requester faces. In certain embodiments, only the position is acquired; in certain embodiments, only the direction is acquired; and in certain embodiments, both the position and the direction are acquired. Since the requester terminal 130 may move together with the service requester, the position of the service requester may be same as the position of the requester terminal 130. Normally, when the service requester is moving, the direction the service requester faces is the direction of the movement, which is the same direction that the requester terminal is moving. When the service requester is not moving (e.g., staying at a position to wait for the service provider), the direction the service requester faces may be acquired by: (1) direct input from the service requester (e.g., by answering a question posted on the requester terminal), (2) prediction based on common behavior (e.g., most people at a curbside may be facing the road and tilting towards the direction where the vehicle is coming from), (3) prediction based on historical data, (4) monitoring the physical features of the service requestor, and/or (5) instructing the service requester (e.g., through the requester terminal) to face a certain direction.

The position of the service requester and/or the direction that the service requester faces may be obtained through a positioning technology in the requester terminal 130, for example, a GPS, a GLONASS, a COMPASS, a QZSS, a WiFi positioning technology, or the like, or any combination thereof. The application installed in the requester terminal 130 may direct the requester terminal 130 to constantly send the real-time position of the service requester and/or the real-time direction that the service requester faces to the processing engine 112. Consequently, the processing engine 112 may acquire the position of the service requester and/or the direction that the service requester faces in real-time or substantially real-time.

In 620, the processing engine 112 (e.g., the processing circuits of the processing engine 112, the identification generation module 420) may generate an image of the first vehicle showing the first vehicle from a perspective of the service requester based on the position of the service requester, the direction that the service requester faces, the position of the first vehicle, and the direction that the first vehicle faces. For example, if the first vehicle is on the north of the service requester, the service requester is facing north, and the first vehicle is facing east, the service requester may see the right side of the first vehicle. The processing engine 112 may generate the image showing the right side of the first vehicle. As another example, if the first vehicle is on the north of the service requester, the service requester is facing north, and the first vehicle is facing south (e.g., the first vehicle is facing the service requester), the service requester may see the front of the first vehicle. The processing engine 112 may generate the image showing the front of the first vehicle.

In some embodiments, if the processing engine 112 determines that the first vehicle is out of the view of the service requester (e.g., the first vehicle is on the north of the service requester and the service requester is facing south, or the first vehicle is too far from the service requester), the processing engine 112 may generate a reminder including a location of the first vehicle relative to the service requester to remind the service requester that the first vehicle is out of the view of the service requester and instruct the service requester to face a direction to make the first vehicle in the view of the service requester, or notify the service requester that the first vehicle will be in sight after a particular time period. For example, in certain embodiments, the processing engine 112 may send a reminder to the service requester to instruct the service requester to face north in response to a determination that the first vehicle is on the north of the service requester and the service requester is facing south. After sending the reminder to the service requester, the processing engine 112 may generate an image showing the front of the first vehicle, send the image to the service requester, and prompt the requester terminal to display the image.

In some embodiments, if the angle between the direction that the service requester faces and the direction that the first vehicle faces, and/or the relative position between the service requester and the first vehicle changes, the processing engine 112 may update the image by reacquiring the position of the first vehicle, the position of the service requester, the direction that the first vehicle faces, and/or the direction that the service requester faces.

Figure 7:
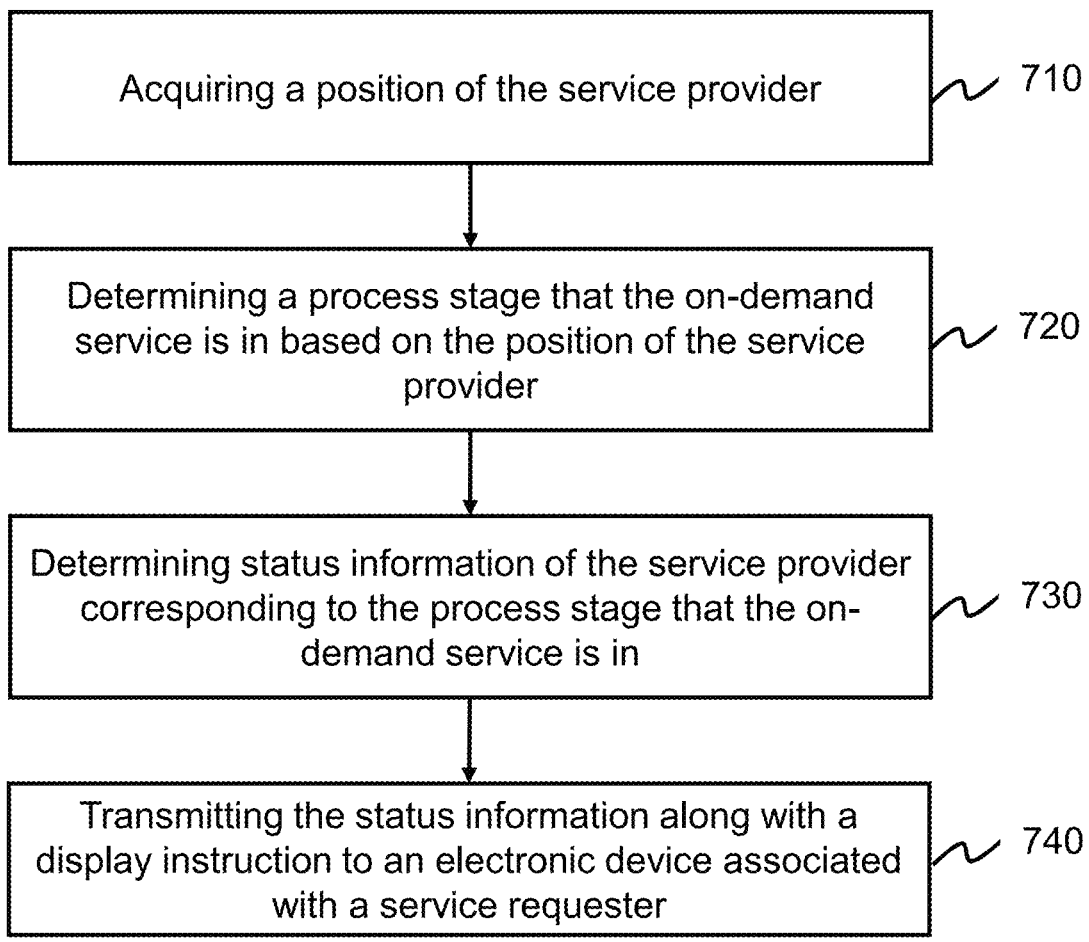
FIG. 7 is a flowchart illustrating an exemplary process for determining status information of a service provider according to some embodiments of the present disclosure.

FIG. 7 is a flowchart illustrating an exemplary process for determining and/or displaying status information of a service provider according to some embodiments of the present disclosure. The process 700 may be implemented in the on-demand service system 100 illustrated in FIG. 1. For example, the process 700 may be stored in the storage device 150 and/or the storage 220 as a form of instructions (e.g., an application), and invoked and/or executed by the server 110 (e.g., the processing engine 112 of the server 110, the processor 220 illustrated in FIG. 2, or one or more modules in the processing engine 112 illustrated in FIG. 4A). The operations of the illustrated process presented below are intended to be illustrative. In some embodiments, the process 700 may be accomplished with one or more additional operations not described, and/or without one or more of the operations discussed. Additionally, the order in which the operations of the process 700 as illustrated in FIG. 7 and described below is not intended to be limiting.

In some embodiments, the processing engine 112 may perform the process 700 after receiving confirmation that the service provider has accepted a service request (e.g., a taxi service request) from a service requester. The service request may include a pickup location, a destination, a departure time, or the like, or any combination thereof. Alternatively or additionally, the processing engine 112 may perform the process 700 after receiving confirmation that the service provider has arrived at the pickup location.

In 710, the processing engine 112 (e.g., the processing circuits of the processing engine 112, the acquisition module 410) may acquire a position (e.g., a real-time position) of the service provider.

In 720, the processing engine 112 (e.g., the processing circuits of the processing engine 112, the process stage determination unit 432) may determine a process stage that the on-demand service (e.g., the taxi service) is in based partly or entirely on the position of the service provider.

In some embodiments, the processing engine 112 may define the process stage based on a travel time of the first vehicle from the position of the service provider to the pickup location, a route distance between the position of the service provider and the pickup location, a travel time of the first vehicle from the position of the service provider to the destination, or a route distance between the position of the service provider and the destination. For example, the processing engine 112 may define a first stage in which the service provider has not arrived at the pickup location, and the route distance between the position of the service provider and the pickup location is longer than a first threshold (e.g., 200 meters) or the travel time of the first vehicle from the position of the service provider to the pickup location may be longer than a second threshold (e.g., 2 minutes). In some embodiments, the first and second thresholds can be set automatically by the system or by the service requestor. The processing engine 112 may define a second stage in which the route distance between the position of the service provider and the pickup location may be shorter than the first threshold or the travel time of the first vehicle from the position of the service provider to the pickup location may be shorter than the second threshold.

In some embodiments, the processing engine 112 may define a third stage in which the service provider may be traveling to the destination of the service requester, and the route distance between the position of the service provider and the destination may be longer than a third threshold (e.g., 1 kilometer) or the travel time of the first vehicle from the position of the service provider to the destination may be longer than a fourth threshold (e.g., 5 minutes). In some embodiments, the third and fourth thresholds can be set automatically by the system or by the service requestor. The processing engine 112 may define a fourth stage in which the service provider may be traveling to the destination of the service requester, and the route distance between the position of the service provider and the destination may be shorter than the third threshold or the travel time of the first vehicle from the position of the service provider to the destination may be shorter than the fourth threshold.

It should be noted that the above description about the first stage, the second stage, the third stage, and the fourth stage is merely provided for the purposes of illustration, and not intended to limit the scope of the present disclosure. In some embodiments, the process stages herein listed can be combined or partitioned more based on the specific circumstances and/or the preferences of the service requester. In some embodiments, different information is provided for different process stage, satisfying different needs of the service requester for different stages. In some embodiments, the processing engine 112 may combine the first stage and the second stage as one stage. The processing engine 112 may combine the third stage and the fourth stage as one stage. The processing engine 112 may divide any one of the first stage, the second stage, the third stage, and the fourth stage into more than one stage based on the travel time of the first vehicle from the position of the service provider to the pickup location, the route distance between the position of the service provider and the pickup location, the travel time of the first vehicle from the position of the service provider to the destination, or the route distance between the position of the service provider and the destination.

In some embodiments, when the service provider (e.g., a driver) has accepted the service request, the service provider may execute an operation to confirm that the service provider has accepted the service request. For example, the service provider may press a button through the interface of the application installed in the provider terminal 140. The provider terminal 140 may send the confirmation that the service provider has accepted the service request to the processing engine 112. In some embodiments, when the service provider (e.g., a driver) has picked up the service requester (e.g., a passenger), the service provider may execute an operation to confirm that the service provider has picked up the service requester. For example, the service provider may press a button through the interface of the application installed in the provider terminal 140. The provider terminal 140 may send the confirmation that the service provider has picked up the service requester to the processing engine 112. The processing engine 112 may determine the process stage that the on-demand service is in based on the confirmation that the service provider has accepted the service request and the confirmation that the service provider has picked up the service requester.

In 730, the processing engine 112 (e.g., the processing circuits of the processing engine 112, the status information determination unit 434) may determine status information of the service provider corresponding to the process stage that the on-demand service is in. In some embodiments, the status information is tailored to suit different needs of the service requester in different process stages. Merely by way of example, the status information corresponding to the first stage may include but not limited to the position of the service provider, the pickup location, the position of the service requester, the route distance between the position of the service provider and the pickup location, the travel time from the position of the service provider to the pickup location, an estimated time of arrival to the pickup location, a route from the position of the service provider to the pickup location, a type of a vehicle associated with the service provider, a color of the vehicle, a plate number of the vehicle, or the like, or any combination thereof. Also by way of example, the status information corresponding to the second stage may include but not limited to the position of the vehicle, the type of the vehicle associated with the service provider, the color of the vehicle, the plate number of the vehicle, the position of the service provider, the pickup location, the position of the service requester, or the like, or any combination thereof. Also by way of example, the status information corresponding to the third stage may include but not limited to the route distance between the position of the service provider and the destination, the travel time from the position of the service provider to the destination, an estimated time of arrival to the destination, the position of the service provider, the destination, a route from the pickup location to the destination, a road condition from the pickup location to the destination, an estimated price of the service request, or the like, or any combination thereof. Also by way of example, the status information corresponding to the fourth stage may include but not limited to the position of the service provider, the destination, the estimated price of the service request, or the like, or any combination thereof.

In some embodiments, the determination of a certain process stage may trigger specific operations as set forth above. For example, when the processing engine 112 determines that the service is in a second stage, the operations as described in FIG. 5 (e.g., 520-550) can be triggered and executed. In certain embodiments, the status information includes the identification information and the requester terminal is prompted to display the status information (e.g., identification information; image; or map) to facilitate the identification of the vehicle associated with the service provider.

In 740, the processing engine 112 (e.g., the processing circuits of the processing engine 112, the transmission module 440) may transmit the status information along with a display instruction to an electronic device (e.g., the requester terminal 130) associated with a service requester. In some embodiments, the processing engine 112 may transmit the status information of the service provider to the requester terminal 130 via the network 120. The display instruction may prompt the requester terminal 130 to display the status information on the screen. In certain embodiments, the display instruction may prompt the requester terminal 130 to display the status information on a lock screen interface of the requester terminal 130 when the requester terminal 130 is in a locked mode.

In some embodiments, after receiving the status information and the display instruction, the requester terminal 130 may display the status information on the lock screen interface of the requester terminal 130 in response to a determination that the screen of the requester terminal 130 is in a locked mode, which may allow the service requester see the status information directly through the lock screen interface of the requester terminal 130 instead of having to unlock the requester terminal 130 and open the application relating to the on-demand service to see the status information. In some embodiments, the requester terminal 130 may display the status information on the interface of the application relating to the on-demand service in response to a determination that the screen of the requester terminal 130 is in an unlocked mode. The status information may be displayed on the lock screen interface and/or the interface of the application in the form of text, image, voice, video, or the like, or any combination thereof.

In some embodiments, at least a part of the status information may be highlighted on the lock screen interface of the requester terminal 130 or the interface of the application. For example, the part of the status information may be displayed, including but not limited to, in a central area of the lock screen interface or the interface of the application, as a bigger font, as a highlighted font, as an image, as a video, as a voice, or the like, or any combination thereof. Merely by way of example, in the first stage, the position of the service provider may be highlighted. In the second stage, the type of the vehicle, the color of the vehicle, or the plate number of the vehicle may be highlighted. In the third stage, the estimated time of arrival to the destination may be highlighted. In the fourth stage, the estimated price of the travel may be highlighted.

It should be noted that the above description is merely provided for the purposes of illustration, and not intended to limit the scope of the present disclosure. For persons having ordinary skills in the art, multiple variations and modifications may be made under the teachings of the present disclosure. However, those variations and modifications do not depart from the scope of the present disclosure. For example, when the requester terminal 130 is unlocked but the application relating to the on-demand service is running in the background, the status information may be displayed on a pop-up interface of the application based on the display instruction.

Figure 8:
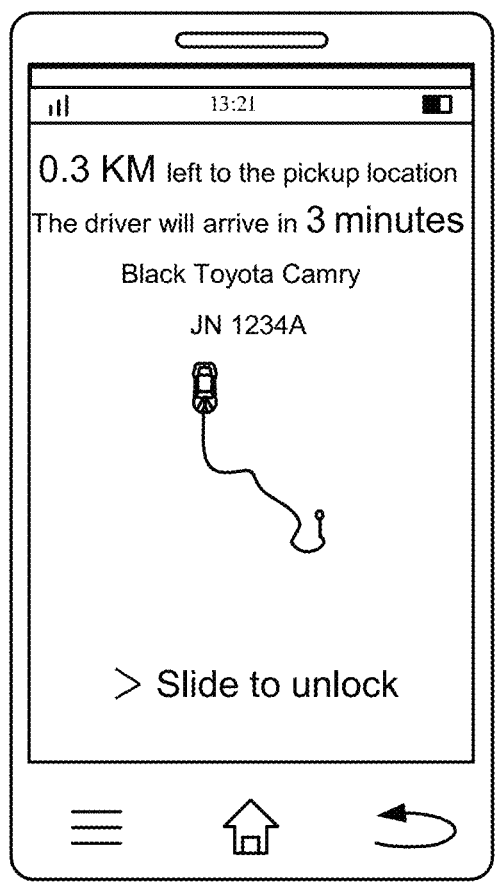
FIGS. 8 and 9 are schematic diagrams illustrating exemplary lock screen interfaces of an electric device associated with a service requester for displaying status information according to some embodiments of the present disclosure.
Figure 9:
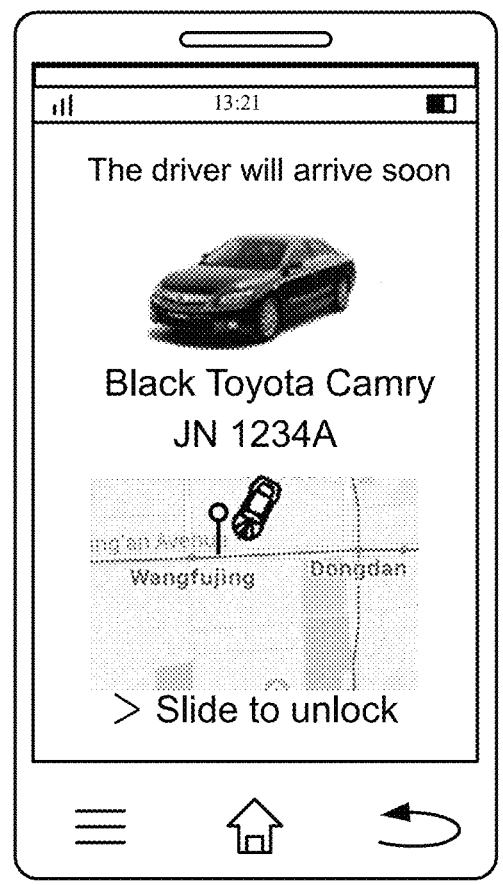

FIGS. 8 and 9 are schematic diagrams illustrating exemplary lock screen interfaces of an electric device associated with the service requester for displaying status information according to some embodiments of the present disclosure. The electric device may include the requester terminal 130. As illustrated in FIGS. 8 and 9, the requester terminal 130 may display the status information on the lock screen interface when the requester terminal 130 is in a locked mode.

As illustrated in FIG. 8, the on-demand service (e.g., the taxi service) is in the first stage in which the service provider has not arrived at the pickup location, and the route distance between the position of the service provider and the pickup location is longer than the first threshold (e.g., 200 meters) or the travel time from the position of the service provider to the pickup location is longer than the second threshold (e.g., 2 minutes). The position of the service provider, the route distance between the position of the service provider and the pickup location, the travel time from the position of the service provider to the pickup location, the type of the vehicle, the plate number of the vehicle, the pickup location, and the route from the position of the service provider to the pickup location may be displayed on the lock screen interface. The route distance (e.g., 0.3 kilometer) between the position of the service provider and the pickup location and the travel time (e.g., 3 minutes) from the position of the service provider to the pickup location may be highlighted with a bigger font.

As illustrated in FIG. 9, the on-demand service (e.g., the taxi service) is in the second stage in which the route distance between the position of the service provider and the pickup location is shorter than the first threshold (e.g., 200 meters) or the travel time from the position of the service provider to the pickup location is shorter than the second threshold (e.g., 2 minutes). The position of the service provider, the type of the vehicle, the plate number of the vehicle, the color of the vehicle, and the pickup location may be displayed on the lock screen interface. The type of the vehicle and the color of the vehicle may be highlighted with a bigger font and an image. The plate number (e.g., JN 1234A) of the vehicle may be highlighted with a bigger font.

Having thus described the basic concepts, it may be rather apparent to those skilled in the art after reading this detailed disclosure that the foregoing detailed disclosure is intended to be presented by way of example only and is not limiting. Various alterations, improvements, and modifications may occur and are intended to those skilled in the art, though not expressly stated herein. These alterations, improvements, and modifications are intended to be suggested by this disclosure, and are within the spirit and scope of the exemplary embodiments of this disclosure.

Moreover, certain terminology has been used to describe embodiments of the present disclosure. For example, the terms "one embodiment," "an embodiment," and/or "some embodiments" mean that a particular feature, structure or characteristic described in connection with the embodiment is included in at least one embodiment of the present disclosure. Therefore, it is emphasized and should be appreciated that two or more references to "an embodiment," "one embodiment," or "an alternative embodiment" in various portions of this specification are not necessarily all referring to the same embodiment. Furthermore, the particular features, structures or characteristics may be combined as suitable in one or more embodiments of the present disclosure.

Further, it will be appreciated by one skilled in the art, aspects of the present disclosure may be illustrated and described herein in any of a number of patentable classes or context including any new and useful process, machine, manufacture, or composition of matter, or any new and useful improvement thereof. Accordingly, aspects of the present disclosure may be implemented entirely hardware, entirely software (including firmware, resident software, micro-code, etc.) or combining software and hardware implementation that may all generally be referred to herein as a "block," "module," "engine," "unit," "component," or "system." Furthermore, aspects of the present disclosure may take the form of a computer program product embodied in one or more computer readable media having computer readable program code embodied thereon.

A computer readable signal medium may include a propagated data signal with computer readable program code embodied therein, for example, in baseband or as part of a carrier wave. Such a propagated signal may take any of a variety of forms, including electro-magnetic, optical, or the like, or any suitable combination thereof. A computer readable signal medium may be any computer readable medium that is not a computer readable storage medium and that may communicate, propagate, or transport a program for use by or in connection with an instruction execution system, apparatus, or device. Program code embodied on a computer readable signal medium may be transmitted using any appropriate medium, including wireless, wireline, optical fiber cable, RF, or the like, or any suitable combination of the foregoing.

Computer program code for carrying out operations for aspects of the present disclosure may be written in any combination of one or more programming languages, including an object oriented programming language such as Java, Scala, Smalltalk, Eiffel, JADE, Emerald, C++, C #, VB. NET, Python or the like, conventional procedural programming languages, such as the "C" programming language, Visual Basic, Fortran 1703, Perl, COBOL 1702, PHP, ABAP, dynamic programming languages such as Python, Ruby and Groovy, or other programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider) or in a cloud computing environment or offered as a service such as a software as a service (SaaS).

Furthermore, the recited order of processing elements or sequences, or the use of numbers, letters, or other designations, therefore, is not intended to limit the claimed processes and methods to any order except as may be specified in the claims. Although the above disclosure discusses through various examples what is currently considered to be a variety of useful embodiments of the disclosure, it is to be understood that such detail is solely for that purpose, and that the appended claims are not limited to the disclosed embodiments, but, on the contrary, are intended to cover modifications and equivalent arrangements that are within the spirit and scope of the disclosed embodiments. For example, although the implementation of various components described above may be embodied in a hardware device, it may also be implemented as a software-only solution—e.g., an installation on an existing server or mobile device.

Similarly, it should be appreciated that in the foregoing description of embodiments of the present disclosure, various features are sometimes grouped together in a single embodiment, figure, or description thereof for the purpose of streamlining the disclosure aiding in the understanding of one or more of the various embodiments. This method of disclosure, however, is not to be interpreted as reflecting an intention that the claimed subject matter requires more features than are expressly recited in each claim. Rather, claimed subject matter may lie in less than all features of a single foregoing disclosed embodiment.

We claim:

1. A system for an on-demand service, comprising:
one or more storage media storing a set of instructions for operating an online on-demand service platform; and
one or more processors configured to communicate with the one or more storage media, wherein when executing the set of instructions, the one or more processors are configured to cause the system to:
receive confirmation that a service provider has accepted a service request from a service requester, wherein the service provider is associated with a first vehicle;
acquire feature information associated with the service provider;
acquire surrounding information associated with the service provider, wherein the surrounding information includes information of one or more second vehicles that are located within a predetermined area, the predetermined area including the first vehicle and the service requester;
generate identification information of the service provider based on the feature information and the surrounding information for the service requester to identify the service provider; and
transmit the identification information of the service provider to a requester terminal associated with the service requester.

2. The system of claim 1, wherein:
the feature information associated with the service provider includes at least one of:
a type of the first vehicle associated with the service provider,
a color of the first vehicle,
a plate number of the first vehicle,
a mark on a surface of the first vehicle,
a position of the first vehicle, and
a direction that the vehicle faces;
and the surrounding information associated with the service provider includes at least one of:
one or more positions of the one or more second vehicles, the predetermined area being a circle area with a diameter of a straight-line distance between the first vehicle and the service requester,
a type of at least one of the one or more second vehicles,
a color of the at least one of the one or more second vehicles, and
a plate number of the at least one of the one or more second vehicles.

3. The system of claim 2, wherein the identification information of the service provider includes an image of the first vehicle showing at least one of:
the type of the first vehicle,
the color of the first vehicle,
the plate number of the first vehicle, and
the mark on the surface of the first vehicle.

4. The system of claim 3, wherein to generate the identification information of the service provider, the one or more processors are configured to cause the system to:
acquire a position of the service requester and a direction that the service requester faces, wherein the direction is acquired by monitoring the service requester's physical features, predicting the service requester's behavior, or instructing the service requester to face the direction; and
generate the image of the first vehicle showing the first vehicle from a perspective of the service requester based on the position of the service requester, the direction that the service requester faces, the position of the first vehicle, and the direction that the first vehicle faces.

5. The system of claim 2, wherein the identification information of the service provider includes a map showing the position of the first vehicle and the one or more positions of the one or more second vehicles that are within the predetermined area, wherein the first vehicle is highlighted on the map.

6. The system of claim 5, wherein the map further shows a route from a position of the service requester to the position of the first vehicle,
and at least one of:
the type of the first vehicle,
the color of the first vehicle,
the plate number of the first vehicle, and
the mark on the surface of the first vehicle.

7. The system of claim 6, wherein the map further shows at least one of:
the type of the at least one of the one or more second vehicles,
the color of the at least one of the one or more second vehicles, and
the plate number of the at least one of the one or more second vehicles.

8. The system of claim 1, wherein when executing the set of instructions, the one or more processors are configured to further cause the system to:
send a display instruction along with the identification information to the requester terminal, wherein the display instruction prompts the requester terminal to display the identification information on a screen of the requester terminal when the screen is locked.

9. A system for an on-demand service, comprising:
one or more storage media storing a set of instructions for operating an online on-demand service platform; and
one or more processors configured to communicate with the one or more storage media, wherein when executing the set of instructions, the one or more processors are configured to cause the system to:
acquire a position of a service provider that accepts a service request of an on-demand service, wherein the service provider is associated with a first vehicle;
determine a process stage that the on-demand service is in based on the position of the service provider;
determine status information of the service provider, wherein the status information corresponds to the process stage that the on-demand service is in, the status information including identification information of the service provider, the identification information including information of one or more second vehicles that are located within a predetermined area, the predetermined area including the first vehicle and the service requester; and transmit the status information along with a display instruction to a requester terminal associated with a service requester that initiates the service request, wherein the display instruction prompts the requester terminal to display the status information on a screen of the requester terminal when the screen is locked.

10. A method for an on-demand service implemented on a machine having one or more processors and one or more storage devices, the method comprising:

receiving confirmation that a service provider has accepted a service request from a service requester, wherein the service provider is associated with a first vehicle;

acquiring feature information associated with the service provider;

acquiring surrounding information associated with the service provider, wherein the surrounding information includes information of one or more second vehicles that are located within a predetermined area, the predetermined area including the first vehicle and the service requester;

generating identification information of the service provider based on the feature information and the surrounding information for the service requester to identify the service provider; and transmitting the identification information of the service provider to a requester terminal associated with the service requester.

11. The method of claim 10, wherein:

the feature information associated with the service provider includes at least one of:
  a type of the first vehicle associated with the service provider,
  a color of the first vehicle,
  a plate number of the first vehicle,
  a mark on a surface of the first vehicle,
  a position of the first vehicle, and
  a direction that the vehicle faces.

12. The method of claim 11, wherein the identification information of the service provider includes an image of the first vehicle showing at least one of:
  the type of the first vehicle,
  the color of the first vehicle,
  the plate number of the first vehicle, and
  the mark on the surface of the first vehicle.

13. The method of claim 12, wherein the generating of the identification information of the service provider comprises:

acquiring a position of the service requester and a direction that the service requester faces, wherein the direction is acquired by monitoring the service requester's physical features, predicting the service requester's behavior, or instructing the service requester to face the direction; and generating the image of the first vehicle showing the first vehicle from a perspective of the service requester based on the position of the service requester, the direction that the service requester faces, the position of the first vehicle, and the direction that the first vehicle faces.

14. The method of claim 10, the method further comprising:

sending a display instruction along with the identification information to the requester terminal, wherein the display instruction prompts the requester terminal to display the identification information on a screen of the requester terminal when the screen is locked.

15. The method of claim 11, wherein:

the surrounding information associated with the service provider includes at least one of:
  one or more positions of the one or more second vehicles, the predetermined area being a circle area with a diameter of a straight-line distance between the first vehicle and the service requester,
  a type of at least one of the one or more second vehicles,
  a color of the at least one of the one or more second vehicles, and
  a plate number of the at least one of the one or more second vehicles.

16. The method of claim 15, wherein the identification information of the service provider includes a map showing the position of the first vehicle and the one or more positions of the one or more second vehicles that are within the predetermined area, wherein the first vehicle is highlighted on the map.

17. The method of claim 16, wherein the map further shows
  a route from a position of the service requester to the position of the first vehicle,
  and at least one of:
  the type of the first vehicle,
  the color of the first vehicle,
  the plate number of the first vehicle, and
  the mark on the surface of the first vehicle.

18. The method of claim 17, wherein the map further shows at least one of:
  the type of the at least one of the one or more second vehicles,
  the color of the at least one of the one or more second vehicles, and
  the plate number of the at least one of the one or more second vehicles.

* * * * *